(12) United States Patent
Keusgen et al.

(10) Patent No.: US 9,219,535 B2
(45) Date of Patent: Dec. 22, 2015

(54) METHOD FOR DETERMINING BEAMFORMING PARAMETERS IN A WIRELESS COMMUNICATION SYSTEM AND TO A WIRELESS COMMUNICATION SYSTEM

(71) Applicant: Fraunhofer-Gesellschaft zur Foerderung der angewandten Forschung e.V., Munich (DE)

(72) Inventors: Wilhelm Keusgen, Berlin (DE); Michael Peter, Berlin (DE); Andreas Kortke, Berlin (DE)

(73) Assignee: Fraunhofer-Gesellschaft Foerderung der angewandten Forschung e.V., Munich (DE)

( * ) Notice: Subject to any disclaimer, the term of this patent is extended or adjusted under 35 U.S.C. 154(b) by 77 days.

(21) Appl. No.: 14/022,636

(22) Filed: Sep. 10, 2013

(65) Prior Publication Data

US 2014/0003481 A1 Jan. 2, 2014

Related U.S. Application Data

(63) Continuation of application No. PCT/EP2012/053464, filed on Feb. 29, 2012, which is a continuation of application No. 13/045,944, filed on Mar. 11, 2011.

(51) Int. Cl.
*H04B 3/46* (2015.01)
*H04B 7/04* (2006.01)
(Continued)

(52) U.S. Cl.
CPC ............ *H04B 7/0482* (2013.01); *H04B 7/0695* (2013.01); *H04B 7/088* (2013.01); *H04B 7/0413* (2013.01); *H04B 7/0465* (2013.01);
(Continued)

(58) Field of Classification Search
CPC ..... H04L 1/20; H04L 1/0009; H04L 27/2647; H04B 17/006; H04B 17/005
USPC .......... 375/267, 260, 259, 316, 219, 295, 227
See application file for complete search history.

(56) References Cited

U.S. PATENT DOCUMENTS

| 2008/0130778 | A1 | 6/2008 | Xia et al. | |
|---|---|---|---|---|
| 2009/0058724 | A1 | 3/2009 | Xia et al. | |
| 2009/0160707 | A1* | 6/2009 | Lakkis | 342/367 |

(Continued)

FOREIGN PATENT DOCUMENTS

| EP | 2 037 594 A2 | 3/2009 |
|---|---|---|
| EP | 2 221 992 A1 | 8/2010 |

(Continued)

OTHER PUBLICATIONS

Official Communication issued in International Patent Application No. PCT/EP2012/053464, mailed on Jan. 4, 2013.

(Continued)

*Primary Examiner* — Zewdu Kassa
(74) *Attorney, Agent, or Firm* — Keating & Bennett, LLP

(57) ABSTRACT

A method for determining a beamforming vector or a beamforming channel matrix in a communication system including a transmitting station and a receiving station, and a communication system. The transmitting and receiving stations include respective antenna groups and respective codebooks include a plurality of predefined beamforming vectors for the antenna group.

44 Claims, 9 Drawing Sheets

(51) Int. Cl.
H04B 7/06 (2006.01)
H04B 7/08 (2006.01)

(52) U.S. Cl.
CPC .............. *H04B7/0617* (2013.01); *H04B 7/0669* (2013.01); *H04B 7/0691* (2013.01); *H04B 7/0874* (2013.01)

(56) References Cited

U.S. PATENT DOCUMENTS

| | | | |
|---|---|---|---|
| 2009/0189812 | A1 | 7/2009 | Xia et al. |
| 2009/0232240 | A1 | 9/2009 | Lakkis |
| 2010/0056062 | A1 | 3/2010 | Zhang et al. |

FOREIGN PATENT DOCUMENTS

| | | |
|---|---|---|
| EP | 2 234 355 A1 | 9/2010 |
| EP | 2 384 075 A1 | 11/2011 |
| WO | 2007/095354 A2 | 8/2007 |
| WO | 2009/093870 A2 | 7/2009 |
| WO | 2010/050874 A1 | 5/2010 |
| WO | 2010/088673 A1 | 8/2010 |

OTHER PUBLICATIONS

"Part 15.3: Wireless Medium Access Control (MAC) and Physical Layer (PHY) Specifications for High Rate Wireless Personal Area Networks (WPANs)", IEEE Standard for Information Technology—Telecommunications and Information Exchange Between Systems—Local and Metropolitan Area Networks—Specification Requirements, Oct. 12, 2009, 84 pages.

NEC Group: "Link Analysis of Multi-rank Beamforming"; 3GPP Draft; R1-062122; 3rd Generation Partnership Project (3GPP), Mobile Competence Centre; 650, Route des Lucioles; F-06921 Sophia Antipolis Cedex; France; vol. RAN WG1, Aug. 28-Sep. 1 2006; pp. 1-24.

NTT DOCOMO: "Investigations on Pre-coding Schemes for MIMO in E-UTRA Downlink"; 3GPP Draft: R1-063311 Precoding for DL MIMO; 3rd Generation Partnership Project (3GPP), Mobile Competence Centre; 650, Route des Lucioles; F-06921 Sophia Antipolis Cedex; France; Riga, Lativa; Nov. 6-10, 2006; 10 pages.

"ECMA-387 Standard: High Rate 60 GHz PHY"; MAC and HDMI PAL; Dec. 2010; retrieved from the Internet: URL:http://www.ecma-international.org/publications/standards/Ecma-387.htm; retrieved Aug. 16, 2012.

"3rd Generation Partnership Project; Technical Specification Group Radio Access Network; Tx Diversity Solutions for Multiple Antennas (Release 6)," 3G TR25.869 V1.2.0, Sep. 29, 2003, 37 pages.

Chung et al., "Recursive EM and SAGE-Inspired Algorithms With Application to DOA Estimation", IEEE Transactions on Signal Processing, vol. 53, No. 8, Aug. 2005, pp. 2664-2677.

Schmidt, "Multiple Emitter Location and Signal Parameter Estimation", IEEE Transactions on Antennas and Propagation, vol. AP-34, No. 3, Mar. 1986, pp. 276-280.

Stoica et al., "Maximum Likelihood Methods for Direction-of-Arrival Estimation", IEEE Transactions on Acoustics, Speech, and Signal Processing, vol. 38, No. 7, Jul. 1990, pp. 1132-1143.

Heath et al., "Multiple Antenna Arrays for Transmitter Diversity and Space-Time Coding", IEEE International Conference on Communications, vol. 1, 1999, pp. 36-40.

Dammann et al., "Beamforming in Combination with Space-Time Diversity for Broadband OFDM Systems", IEEE International Conference on Communication, 2002, pp. 165-171.

Morelos-Zaragoza et al., "Combined Beamforming and Space-Time Block Coding with a Sparse Array Antenna", The 5th International Symposium on Wireless Personal Multimedia Communications, vol. 2, 2002, pp. 432-434.

Wu et al., "Planar Arrays Hybrid Beamforming for SDMA in Millimeter Wave Applications", IEEE 19th International Symposium on Personal, Indoor and Mobile Radio Communications, 2008, pp. 1-6.

Wu et al., "Hybrid Beamforming Using Convex Optimization for SDMA in Millimeter Wave Radio", IEEE 20th International Symposium on Personal, Indoor and Mobile Radio Communications, 2008, pp. 823-827.

Smolders et al., "THousand Element Array (THEA)", IEEE Antennas and Propagation Society International Symposium, vol. 1, 2000, pp. 162-165.

Love et al., "Equal Gain Transmission in Multiple-Input Multiple-Output Wireless Systems", IEEE Transactions on Communications, vol. 51, No. 7, Jul. 2003 pp. 1102-1110.

http://chaos.if.uj.edu.pl/~karol/hadamard/.

Frank et al., "Phase Shift Pulse Codes With Good Periodic Correlation Properties", IRE Transactions on Information Theory, Oct. 1962, pp. 381-382.

Keusgen et al., "Method for Determining Beamforming Parameters in a Wireless Communication System and to a Wireless Communication System", U.S. Appl. No. 13/045,944, filed Mar. 11, 2011.

* cited by examiner

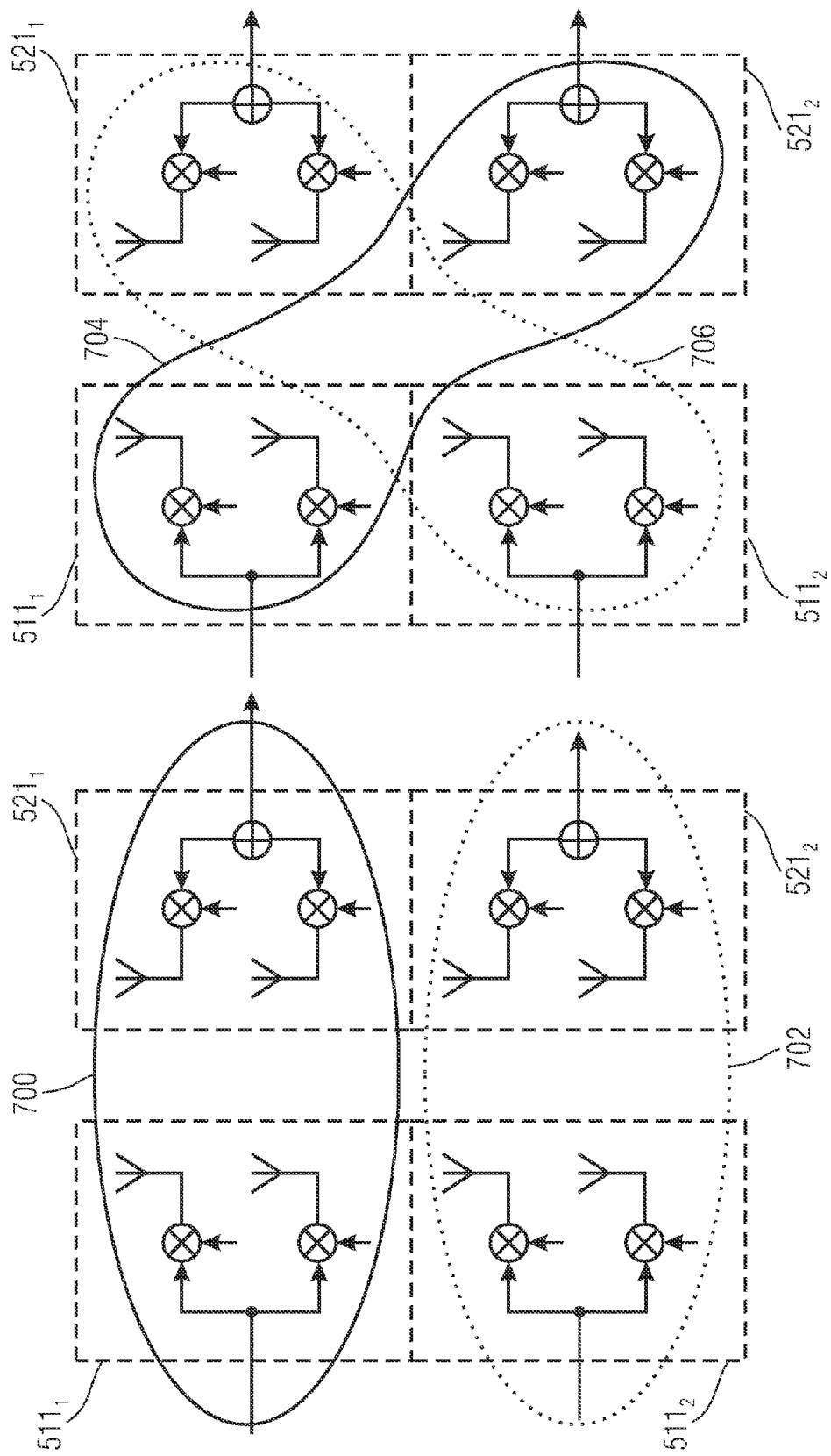

METHOD FOR DETERMINING BEAMFORMING PARAMETERS IN A WIRELESS COMMUNICATION SYSTEM AND TO A WIRELESS COMMUNICATION SYSTEM

CROSS-REFERENCE TO RELATED APPLICATIONS

This application is a continuation of copending International Application No. PCT/EP2012/053464, filed Feb. 29, 2012, which is incorporated herein by reference in its entirety, and additionally claims priority from U.S. application Ser. No. 13/045,944, filed Mar. 11, 2011, which is also incorporated herein by reference in its entirety.

Embodiments of the invention relate to a method for determining beamforming parameters in a wireless communication system, and to a wireless communication system. More specifically, embodiments of the invention may be used for improving the transmission in wireless communication systems and may be particularly interesting for mobile radio systems and wireless millimeter wave transmission systems.

BACKGROUND OF THE INVENTION

For improving the performance of wireless communication networks or radio systems, multi antenna techniques using group antennas (antenna arrays) at the transmitting side and at the receiving side may be used. One approach is called beamforming, and in accordance with this approach a signal is split at the transmitter and multiplied by a complex weighting factor (having a magnitude and a phase) for every transmitter antenna individually. At the receiver, the signals of the individual receiving antennas are also weighted with complex factors and added. Weighting the signals of a group antenna is implemented by a beamformer. If the weights all have constant amplitude and differ only in phase, this is referred to as equal-gain beamforming or as a phased array. Contrary to the beamforming signal processing, in MIMO signal processing (MIMO=Multiple-Input Multiple-Output), not only complex weightings but also costly digital signal processing operations need to be performed in every branch. The MIMO operations may each have a different effect on certain portions of the antenna signals (samples in time or frequency), whereas in beamforming all signal portions are weighted identically. Equal-gain beamformers may be implemented in analog circuitry with relatively little effort and are hence particularly interesting when a large number of antennas is used. In contrast, systems using MIMO signal processing entail a higher effort in the analog and digital circuitry and are hence generally limited to moderate numbers of antennas, e.g. to only 2 or 4 antennas.

FIG. 1 shows a schematic equivalent baseband representation of a unidirectional wireless communication system comprising M antennas at the transmitter and N antennas at the receiver. The system 100 comprises a transmitter 102 having an input 104 at which an input data signal $d_s$ to be transmitted in the wireless communication system or radio system 100 is received. The transmitter comprises a plurality of antennas $105_1, 105_2, \ldots 105_M$, i.e. the transmitter 102 comprises M antennas. The input data signal received at the input 104 is processed by a transmitter signal processing unit 106 which outputs a signal x to be transmitted. The signal x received at the beamformer input 107 is distributed via a transmit beamformer 108 to the respective antennas $105_1$ to $105_M$. The beamformer 108 comprises a dividing or splitting circuit 109 and a plurality of weighting elements $110_1, 110_2, \ldots 110_M$ applying to the input signal x received at the beamformer input 107 respective weighting factors $w_1, w_2, \ldots, w_M$. The weighted input signals are transmitted from the antennas $105_1$ to $105_M$ via a radio channel 112 to a receiver 114. The receiver 114 comprises a plurality of receive antennas $116_1, 116_2, \ldots, 116_N$. The signals received from the respective antennas $116_1$ to $116_N$ are fed into a receive beamformer 118. The receive beamformer 118 comprises a plurality of weighting elements $120_1, 120_2, \ldots 120_N$ that are provided for applying to the respective signals received from the antennas $116_1$ to $116_N$ the respective weighting factors $z_1, z_2, \ldots z_N$ and an adding circuit 122. The adding circuit adds the weighted receive signals to form the output signal y of the beamformer 118 that is provided at an output 124. The signal y is fed into the receiver signal processing unit 126 providing the received data signal $d_r$ at the output 128 of the receiver 114. In case beamforming is done at the transmitter and at the receiver, a beamforming system comprises a transmit beamformer, transmit antennas, receive antennas and a receive beamformer. For example, the transmit beamformer 108, the transmit antennas $105_1$ to $105_M$, the receive antennas $116_1 \ldots 116_N$ and the receive beamformer 118 shown in FIG. 1 form a beamforming system. When beamforming is only applied at the transmitter, the beamforming system comprises the transmit beamformer, the transmit antennas, and the receive antennas. Alternatively, when using beamforming only at the receiver, the beamforming system comprises the transmit antennas, the receive antennas, and the receive beamformer.

At the transmitter 102 M beamforming branches are formed, each of the beamforming branches comprises one of the weighting elements of the beamformer 108 and one of the antennas of the transmitter. For example, a first beamforming branch is formed by the weighting element $110_1$ of the beamformer 108 and the antenna $105_1$. Likewise, at the receiver 114 N beamforming branches are formed, the respective branches comprises one of the weighting elements of the beamformer 118 and one of the antenna elements of the receiver. For example, a first beamforming branch at the receiver 114 is formed by the antenna element $116_1$ and the weighting element $120_1$ of the receive beamformer 118.

By beamforming at the transmitter 102, the power radiated in certain space directions is increased, while it is reduced in other space directions. Beamforming at the receiver 114 has the effect that signals from certain space directions are received in an amplified manner and from other space directions in an attenuated manner. Because the transmission attenuation increases with rising transmission frequencies, beamforming is considered as promising and inexpensive means for increasing the performance of systems having high transmission frequencies, e.g. future 60 GHz systems.

The weighting factors $w_1, w_2, \ldots, w_M$ or $z_1, z_2, \ldots, z_M$ for the individual antennas $105_1$ to $105_M$ or $116_1$ to $116_N$ at the transmitter 102 or at the receiver 114 may each be combined into one beamforming vector. FIG. 1 shows an example of an unidirectional wireless communication system allowing for a transmission using M beamforming branches at the transmitter 102 and N beamforming branches at the receiver 114. The adjustment of the signals provided by the transmitter 102 using the transmit beamformer 108 is described by the transmit beamforming vector w:

$$w = \begin{pmatrix} w_1 \\ w_2 \\ \vdots \\ w_M \end{pmatrix}$$

The adjustment of the signals received at the receiver 114 using the receive beamformer 118 is described by the receive beamforming vector z:

$$z = \begin{pmatrix} z_1 \\ z_2 \\ \vdots \\ z_N \end{pmatrix}$$

In the case of using the equal-gain beamforming, the elements of the beamforming vectors have a constant modulus. If the magnitude of the beamforming vectors is defined to 1, the beamforming vectors are given as follows:

$$w = \sqrt{\frac{1}{M}} \begin{pmatrix} \exp(j\vartheta_1) \\ \exp(j\vartheta_2) \\ \vdots \\ \exp(j\vartheta_M) \end{pmatrix}$$

and $$z = \sqrt{\frac{1}{N}} \begin{pmatrix} \exp(j\varphi_1) \\ \exp(j\varphi_2) \\ \vdots \\ \exp(j\varphi_N) \end{pmatrix}$$

wherein
$\theta_m$=phase values it $\theta_m \in [0, 2\pi]$ for the transmitter 102, and
$\phi_n$=phase values $\phi_n \in [0, 2\pi]$ for the receiver 114.

Many known systems may use discrete (quantized) phase values only, so that the number of possible beamforming vectors is limited.

The wireless transmission between the antenna groups 106 and 116 at the transmitting side 102 and at the receiving side 114 is performed via the radio channel 112 including all possible connection paths between all transmitting antennas $106_1$ to $106_M$ and all receiving antennas $116_1$ to $116_N$. The radio channel 112 is defined using a matrix, the so called channel matrix H.

The presented beamforming techniques are considered for a unidirectional transmission between a transmitter 102 and a receiver 114. Conventionally, wireless communications systems are provided for a bidirectional transmission between stations. Each station needs to be provided with a transmitter and a receiver. Both in the transmitter and in the receiver beamforming techniques may be used. FIG. 1(a) depicts a bidirectional, wireless beamforming transmission system 900 having two stations 902 and 904. Each station is provided with a transmitter 906, 910 and a receiver 908, 912 having a structure as described in FIG. 1. Up to four beamforming vectors may be involved in case of such a bidirectional transmission between the two stations, station 902 and station 904: for a transmission from the station 902 to the station 904 the beamformer 914 at the station 902 may use for a transmitting beamforming at station 902, and the beamformer 916 at the station 904 may use for a receiving beamforming at station 904; and for a transmission from the station 904 to the station 902 the beamformer 918 at the station 904 may use for a transmitting beamforming at station 904, and the beamformer 920 at the station 902 may use for a receiving beamforming at station 902. Since a bidirectional transmission can be split into two unidirectional transmissions in opposite directions, with respect to the beamforming techniques it is sufficient to consider a unidirectional transmission and a unidirectional transmission system, respectively, including one transmitter and one receiver.

A problem for the operation of a multi-antenna system using beamforming is the adaptive (dynamic) adjustment of the beamforming vectors for maximizing the transmission quality in dependence on the propagation conditions. The methods for determining beamforming vectors may be divided into two categories: Methods with explicit beamforming channel knowledge, and methods without beamforming channel knowledge. In the former case, beamforming channel knowledge means that the radio channel 112 between any transmitting beamformer antenna element $106_1$ to $106_M$ and any receiving beamformer antenna element $116_1$ to $116_N$, i.e. the beamforming channel matrix, is known. In the latter case, estimating the channel matrix presents a significant additional challenge. In bidirectional transmission, in general, two channel matrices are to be considered: one for the forward direction and one for the backward direction, and they have to be acquired in practice by a beamforming channel estimation.

The following problems occur when using a beamforming system with beamforming signal processing according to FIG. 1:

1. Determining optimal beamforming vectors at transmitter and receiver without explicit channel knowledge.
2. Estimating a multi-antenna channel in systems with beamforming signal processing.
3. Determining suitable beamforming vectors at the transmitter and at the receiver using channel knowledge for systems with pure beamforming signal processing.

The following problem occurs when using a hybrid MIMO beamforming system with MIMO signal processing and beamforming signal processing according to FIG. 5:

4. Determining suitable beamforming vectors at the transmitter and at the receiver in hybrid MIMO beamforming systems.

For determining suitable beamforming vectors, known methods without explicit channel knowledge provide for a training phase, during which test signals or training symbols are transmitted and evaluated within a training frame at different suitably selected beamforming vectors (see e.g. *ECMA-387 Standard: High Rate 60 GHz PHY, MAC and HDMI PAL*, 2008, Ecma International). The temporal sequence of beamforming adjustments may be described by a matrix (a training matrix), which consists of the respective beamforming vectors. In a bidirectional radio system using two-way beamforming in the transmitting and receiving branches, transmission of training frames is performed in both directions. Optimizing the beamforming vectors is obtained by repeating the alternating transmission several times and iteratively adapting the beamforming vectors.

At present methods for determining the beamforming channel matrix are only known for systems where a group antenna is used only on one side (at the transmitter or at the receiver). In such a case, the beamforming channel matrix transitions into a beamforming channel vector, which is calculated using side information. The side information relate to the direction of incidence of the receive signal or the desired transmitting direction of the transmit signal and the geometry of the group antenna. This involves the presence of definite a-priori directional information and only little multipath propagation may exist in the radio channel (a typical field of such an application is the communication to a geostationary satellite, a communication from a vehicle, or a target tracking radar). Estimating the directional information for the receiver merely from the receive signals without a-priori information is possible, involves, however, MIMO signal processing see e.g. Chung, Pei-Jung and Bohme, J. F., "Recursive EM and SAGE-inspired algorithms with application to DOA estimation" *Signal Processing, IEEE Transactions on,* 53(8):2664-2677, 2005; Schmidt, R., "Multiple emitter location and signal parameter estimation", *Antennas and Propagation, IEEE Transactions on,* 34(3):276-280, 1986; or Stoica, P. and Sharman, K. C., "Maximum likelihood methods for direction-of-arrival estimation", *Acoustics, Speech and Signal Processing, IEEE Transactions on,* 38(7):1132-1143, 1990).

Methods for determining a beamforming vector on the transmitter side or on the receiver side using channel knowledge from the directional information have been known for a long time for phased-array applications. However, these direction-based methods may only be applied with little or non-existing multipath propagation. Methods for determining the optimal beamforming vectors on the transmitter side and on the receiver side using channel knowledge—also with multipath propagation—have so far only been known for systems having MIMO signal processing (see e.g. Heath, R. W., Jr. and Paulraj, A., "Multiple antenna arrays for transmitter diversity and space-time coding", *Communications, 1999. ICC '99. 1999 IEEE International Conference on,* pages 36-40 vol. 1., 1999). For MIMO systems, different approaches for determining the channel matrix are known. Transferring such techniques to systems having only beamforming signal processing has not been possible so far, since, on the one hand, channel knowledge without side information (directional information) was not available for these systems and, on the other hand, it was unclear how a common beamforming vector is to be determined for all possibly different signal portions (in time and frequency).

For hybrid methods the principle of combining beamforming and MIMO signal processing is described e.g. by Dammann, A. and Raulefs, R. and Kaiser, S., "Beamforming in combination with space-time diversity for broadband OFDM systems", *Communications, 2002. ICC 2002. IEEE International Conference on,* pages 165-171, 2002. Smart antennas are controlled via an adaptive antenna processor. The aim of beamforming is the transmission of the signal via several ideally statistically independent propagation paths. On the transmitting side, the data stream is split into several substreams based on the diversity principle, and combined again on the receiving side. Among others, space-time coding (STC) as a form of MIMO signal processing is suggested as method. Further, when using beamforming at the transmitter and receiver, a mutual allocation of the transmitting and the receiving antenna groups may be performed, wherein every group generates one data channel. However, a method for the allocation is not presented by Dammann, A. and Raulefs, R. and Kaiser, S., "Beamforming in combination with space-time diversity for broadband OFDM systems", *Communications, 2002. ICC 2002. IEEE International Conference on,* pages 165-171, 2002. Further, it is assumed that the antenna processor provides the directions into which the beams are to be formed. Methods for determining the beamforming vectors are not discussed. In Morelos-Zaragoza, R. H. and Ghavami, M., "Combined beamforming and space-time block coding with a sparse array antenna", *Wireless Personal Multimedia Communications, 2002. The 5th International Symposium on,* pages 432-434 vol. 2, 2002, beamforming is also considered in the context of STC. The research focus lies on the influence of a correlation between different antenna beams on the performance of the system. Methods for determining suitable beamforming vectors are not considered.

Heath, R. W., Jr. and Paulraj, A., "Multiple antenna arrays for transmitter diversity and space-time coding", *Communications, 1999. ICC '99. 1999 IEEE International Conference on,* pages 36-40 vol. 1., 1999 examine what gains may be obtained with different transmitting side diversity technologies in combination with beamforming, and what effect beamforming vectors deviating from the optimum have. The considerations are limited to a system having several antenna groups at the transmitter and one antenna at the receiver (MISO) and only apply under the assumption that only one propagation path exists between one antenna group and the receiver. Further, the research relates to a single user, wherein it is noted that in a multi-user system beamforming is not only to be used for maximizing the received power for the desired user, but at the same time for reducing interference for other users. This principle is also described by Wu, Sau-Hsuan and Chiu, Lin-Kai and Lin, Ko-Yen and Chung, Shyh-Jong, "Planar arrays hybrid beamforming for SDMA in millimeter wave applications" *Personal, Indoor and Mobile Radio Communications, 2008. PIMRC 2008. IEEE 19th International Symposium on,* pages 1-6, 2008; Wu, Sau-Hsuan and Lin, Ko-Yen and Chiu, Lin-Kai, "Hybrid beamforming using convex optimization for SDMA in millimeter wave radio", *Personal, Indoor and Mobile Radio Communications, 2009 IEEE 20th International Symposium on,* pages 823-827, 2009; and Smolders, A. B. and Kant, G. W., "THousand Element Array (THEA)" *Antennas and Propagation Society International Symposium, 2000. IEEE,* pages 162-165 vol. 1, 2000, where hybrid beamforming is considered. It is to be noted that the term "hybrid" refers to the combination of beamforming in the baseband and in the RF-range. The approach does include a transceiver architecture having several parallel transmitting and receiving branches in the digital baseband, however, no MIMO signal processing but beamforming signal processing is performed on the branches. Hence, the same are no hybrid methods in the sense of the above definition.

Thus, there is a need for methods for determining suitable beamforming parameters in a wireless communications system or network including beamforming systems.

SUMMARY

According to an embodiment, a method for determining a beamforming vector of an antenna group of a transmitting station in a wireless communication system and a beamforming vector of an antenna group of a receiving station in the wireless communication system, wherein each of the transmitting station and the receiving station has a codebook including a plurality of predefined beamforming vectors, may have the steps of: performing a test transmission from the transmitting station to the receiving station using a test signal and a beamforming vector pair, the beamforming vector pair including a beamforming vector selected from the codebook of the transmitting station and a beamforming vector selected from the codebook of the receiving station, determining a transmission characteristic of the test transmission at the receiving station, repeating the test transmission and the determination of the transmission characteristic using different beamforming vector pairs, and determining the beamforming vectors of the transmitting and receiving stations from the beamforming vector pair for which the transmission characteristic has a predefined value, wherein the beamforming vectors for the transmitting station and for the receiving station are each taken column by column, starting with column 1, successively from respective training matrices $T_T$ at the transmitting station and $T_R$ at the receiving station so that that each beamforming vector from the codebook of the transmitting station encounters all beamforming vectors from the codebook of the receiving station, and wherein the training matrices $T_T$, $T_R$ are determined as follows:

$$T_T = 1_{1,K_R} \otimes C_T,$$

$$T_R = C_R \otimes 1_{1,K_T},$$

wherein:
$T_T$ = training matrix for beamforming at the transmitting station,
$T_R$ = training matrix for beamforming at the receiving station,
$C_T$ = codebook matrix of the transmitting station,
$C_R$ = codebook matrix of the receiving station,
$K_T$ = the number of beamforming vectors in the codebook of the transmitting station,
$K_R$ = the number of beamforming vectors in the codebook of the receiving station,
$1_{1,K_T}$ = a row vector having $K_T$ elements that are each 1,
$1_{1,K_R}$ = a row vector having $K_R$ elements that are each 1.

According to another embodiment, a wireless communication system may have: a transmitting station including an antenna group and a codebook including a plurality of predefined beamforming vectors for the antenna group of the transmitting station, and a receiving station including an antenna group and a codebook including a plurality of predefined beamforming vectors for the antenna group of the receiving station, wherein, for determining a beamforming vector of the antenna groups of the transmitting and receiving stations, the wireless communication system is configured to: perform a test transmission from the transmitting station to the receiving station using a test signal and a beamforming vector pair, the beamforming vector pair including a beamforming vector selected from the codebook of the transmitting station and a beamforming vector selected from the codebook of the receiving station, determine a transmission characteristic of the test transmission at the receiving station, repeat the test transmission and the determination of the transmission characteristic using different beamforming vector pairs, and determine the beamforming vectors of the transmitting and receiving stations from the beamforming vector pair for which the transmission characteristic has a predefined value, wherein the beamforming vectors for the transmitting station and for the receiving station are each taken column by column, starting with column 1, successively from respective training matrices $T_T$ at the transmitting station and $T_R$ at the receiving station so that that each beamforming vector from the codebook of the transmitting station encounters all beamforming vectors from the codebook of the receiving station, and wherein the training matrices $T_T$, $T_R$ are determined as follows:

$$T_T = 1_{1,K_R} \otimes C_T,$$

$$T_R = C_R \otimes 1_{1,K_T},$$

wherein:
$T_T$ = training matrix for beamforming at the transmitting station,
$T_R$ = training matrix for beamforming at the receiving station,
$C_T$ = codebook matrix of the transmitting station,
$C_R$ = codebook matrix of the receiving station,
$K_T$ = the number of beamforming vectors in the codebook of the transmitting station,
$K_R$ = the number of beamforming vectors in the codebook of the receiving station,
$1_{1,K_T}$ = a row vector having $K_T$ elements that are each 1,
$1_{1,K_R}$ = a row vector having $K_R$ elements that are each 1.

According to another embodiment, a method for determining a beamforming channel matrix describing a radio channel between a transmitting station and a receiving station of a wireless communication system, the transmitting and receiving stations including respective antenna groups, may have the steps of: performing a plurality of test transmissions from the transmitting station to the receiving station using a test signal, wherein for each of the plurality of test transmissions the beamforming vectors at the transmitting station and at the receiving station are varied on the basis of a transmit estimate matrix $E_T$ and a receive estimate matrix $E_R$, wherein each element of an estimate matrix defines the beamforming weight for a specific antenna from the antenna group used during a specific test transmission, and determining from all test transmissions the beamforming channel matrix, wherein the transmit and receive estimate matrices $E_T$, $E_R$ are defined as follows:

$$E_T = 1_{1,N} \otimes B_T,$$

$$E_R = B_R \otimes 1_{1,M},$$

wherein:
$E_T$ = transmit estimate matrix,
$B_T$ = base transmit estimate matrix having the dimension M×M for the transmitting station having M transmit antennas and having beamforming weights for the transmitting station,
$E_R$ = receive estimate matrix,
$B_R$ = base receive estimate matrix having the dimension N×N for the receiving station having N receive antennas and having beamforming weights for the receiving station,
$1_{1,N}$ = a row vector having N elements that are equal 1, and
$1_{1,M}$ = a row vector having M elements that are equal 1,
wherein $[E_T]_{m,k}$ describes a beamforming weight for the m-th transmit antenna during the k-th test transmission of N·M test transmissions,
wherein $[E_R]_{n,k}$ describes a beamforming weight for the n-th receive antenna during the k-th transmission of the N·M test transmissions, and
wherein the beamforming channel matrix is estimated based on the base transmit estimate matrix $B_T$, the base receive estimate matrix $B_R$ and the received test signal.

According to another embodiment, a wireless communication network may have: a transmitting station having an antenna group for beamforming, and a receiving station having an antenna group for beamforming, wherein, for determining a beamforming channel matrix describing a radio channel between a transmitting station and a receiving station of the wireless communication system, the wireless communication system is configured to: perform a plurality of test transmissions from the transmitting station to the receiving station using a test signal, wherein for each of the plurality of test transmissions the beamforming vectors at the transmitting station and at the receiving station are varied on the basis of a transmit estimate matrix and a receive estimate matrix, wherein each element of an estimate matrix defines the beamforming weight for a specific antenna from the antenna group used during a specific test transmission, and determine from all test transmissions the beamforming channel matrix, wherein the transmit and receive estimate matrices $E_T$, $E_R$ are defined as follows:

$$E_T = 1_{1,N} \otimes B_T,$$

$$E_R = B_R \otimes 1_{1,M},$$

wherein:

$E_T$=transmit estimate matrix, $B_T$=base transmit estimate matrix having the dimension M×M for the transmitting station having M transmit antennas and having beamforming weights for the transmitting station, $E_R$=receive estimate matrix, $B_R$=base receive estimate matrix having the dimension N×N for the receiving station having N receive antennas and having beamforming weights for the receiving station, $1_{1,N}$=a row vector having N elements that are equal 1, and $1_{1,M}$=a row vector having M elements that are equal 1, wherein $[E_T]_{m,k}$ describes a beamforming weight for the m-th transmit antenna during the k-th test transmission of N·M test transmissions, wherein $[E_R]_{n,k}$ describes a beamforming weight for the n-th receive antenna during the k-th transmission of the N·M test transmissions, and wherein the beamforming channel matrix is estimated based on the base transmit estimate matrix $B_T$, the base receive estimate matrix $B_R$ and the received test signal.

According to another embodiment, a method for determining a transmit beamforming vector $w_{CH}$ of an antenna group of a transmitting station in a wireless communication system and a receive beamforming vector $z_{CH}$ of an antenna group of a receiving station in the wireless communication system, wherein each of the transmitting station and the receiving station includes a codebook $C_T$, $C_R$ having a plurality of predefined beamforming vectors w, z, may have the steps of: determining from the codebook $C_T$ of the transmitting station the transmit beamforming vector $w_{CH}$ yielding a first predefined result when applying the beamforming weights defined in the beamforming vectors w from the codebook $C_T$ of the transmitting station to a known beamforming channel matrix H describing the radio channel between the transmitting station and the receiving station, and determining from the codebook $C_R$ of the receiving station the receive beamforming vector $z_{CH}$ yielding a second predefined result when applying the beamforming weights defined in the beamforming vectors z from the codebook $C_R$ of the receiving station to a combination of the known beamforming channel matrix H and the determined transmit beamforming vector $w_{CH}$.

According to another embodiment, a method for determining a transmit beamforming vector $w_{CH}$ of an antenna group of a transmitting station in a wireless communication system and a receive beamforming vector $z_{CH}$ of an antenna group of a receiving station in the wireless communication system, wherein each of the transmitting station and the receiving station includes a codebook $C_T$, $C_R$ having a plurality of predefined beamforming vectors w, z, may have the steps of: determining from the codebook $C_R$ of the receiving station the receive beamforming vector $z_{CH}$ yielding a first predefined result when applying the beamforming weights defined in the beamforming vectors z from the codebook $C_R$ of the receiving station to a known beamforming channel matrix H describing the radio channel between the transmitting station and the receiving station, and determining from the codebook $C_T$ of the transmitting station the transmit beamforming vector $w_{CH}$ yielding a second predefined result when applying the beamforming weights defined in the beamforming vectors w from the codebook $C_T$ of the transmitting station to a combination of the known beamforming channel matrix H and the determined receive beamforming vector $z_{CH}$.

According to another embodiment, a wireless communication system may have: a transmitting station having an antenna group and a codebook $C_T$ having a plurality of predefined beamforming vectors w for the antenna group of the transmitting station, and a receiving station having an antenna group and a codebook $C_R$ having a plurality of predefined beamforming vectors z for the antenna group of the receiving station, wherein, for determining a transmit beamforming vector $w_{CH}$ of the antenna groups of the transmitting station and for determining a receive beamforming vector $z_{CH}$ of the antenna groups of the receiving station, the wireless communication system is configured to: determine from the codebook $C_T$ of the transmitting station the transmit beamforming vector $w_{CH}$ yielding a first predefined result when applying the beamforming weights defined in the beamforming vectors w from the codebook $C_T$ of the transmitting station to a known beamforming channel matrix H describing the radio channel between the transmitting station and the receiving station, and determine from the codebook $C_R$ of the receiving station the receive beamforming vector $z_{CH}$ yielding a second predefined result when applying the beamforming weights defined in the beamforming vectors z from the codebook $C_R$ of the receiving station to a combination of the known beamforming channel matrix H and the determined transmit beamforming vector $w_{CH}$, or determine from the codebook $C_R$ of the receiving station the receive beamforming vector $z_{CH}$ yielding a first predefined result when applying the beamforming weights defined in the beamforming vectors z from the codebook $C_R$ of the receiving station to a known beamforming channel matrix H describing the radio channel between the transmitting station and the receiving station, and determine from the codebook $C_T$ of the transmitting station the transmit beamforming vector $w_{CH}$ yielding a second predefined result when applying the beamforming weights defined in the beamforming vectors w from the codebook $C_T$ of the transmitting station to a combination of the known beamforming channel matrix H and the determined receive beamforming vector $z_{CH}$.

According to another embodiment, a method for determining beamforming vectors for a transmitting station in a wireless communication system and beamforming vectors for a receiving station in the wireless communication system, wherein both the transmitting station and the receiving station include a hybrid MIMO beamforming configuration having a plurality of MIMO branches, each MIMO branch having a plurality of antennas, may have the steps of: splitting the hybrid MIMO beamforming system into a plurality of subsystems, each subsystem having at least one MIMO transmit branch on the transmitting side and at least one MIMO receive branch on the receiving side, and determining the transmit and the receive beamforming parameters for each subsystem separately.

According to another embodiment, a wireless communication system may have: a transmitting station, and a receiving station, wherein both the transmitting station and the receiving station include a hybrid MIMO beamforming configuration having a plurality of MIMO branches, each MIMO branch having a plurality of antennas, and wherein the system is configured to split the hybrid MIMO beamforming system into a plurality of subsystems, each subsystem having at least one MIMO transmit branch on the transmitting side and at least one MIMO receive branch on the receiving side, and determine the beamforming vectors for each subsystem separately.

Another embodiment may have a computer program having instructions for performing a method for determining a beamforming vector of an antenna group of a transmitting station in a wireless communication system and a beamforming vector of an antenna group of a receiving station in the wireless communication system, wherein each of the transmitting station and the receiving station has a codebook including a plurality of predefined beamforming vectors, when executing the instructions by a computer, which method may have the steps of: performing a test transmission from the transmitting station to the receiving station using a test signal and a beamforming vector pair, the beamforming vector pair including a beamforming vector selected from the codebook of the transmitting station and a beamforming vector selected from the codebook of the receiving station, determining a transmission characteristic of the test transmission at the receiving station, repeating the test transmission and the determination of the transmission characteristic using different beamforming vector pairs, and determining the beamforming vectors of the transmitting and receiving stations from the beamforming vector pair for which the transmission characteristic has a predefined value, wherein the beamforming vectors for the transmitting station and for the receiving station are each taken column by column, starting with column 1, successively from respective training matrices $T_T$ at the transmitting station and $\underline{T}_R$ at the receiving station so that that each beamforming vector from the codebook of the transmitting station encounters all beamforming vectors from the codebook of the receiving station, and wherein the training matrices $T_T$, $T_R$ are determined as follows:

$$T_T = 1_{1,K_R} \otimes C_T,$$

$$T_R = C_R \otimes 1_{1,K_T},$$

wherein:
$T_T$=training matrix for beamforming at the transmitting station,
$T_R$=training matrix for beamforming at the receiving station,
$C_T$=codebook matrix of the transmitting station,
$C_R$=codebook matrix of the receiving station,
$K_T$=the number of beamforming vectors in the codebook of the transmitting station,
$K_R$=the number of beamforming vectors in the codebook of the receiving station,
$1_{1,K_T}$=row vector having $K_T$ elements that are each 1,
$1_{1,K_R}$=a row vector having $K_R$ elements that are each 1.

Another embodiment may have a computer program having instructions for performing a method for determining a beamforming channel matrix describing a radio channel between a transmitting station and a receiving station of a wireless communication system, the transmitting and receiving stations including respective antenna groups and respective codebooks having a plurality of predefined beamforming vectors for the antenna group, when executing the instructions by a computer, which method may have the steps of: performing a plurality of test transmissions from the transmitting station to the receiving station using a test signal, wherein for each of the plurality of test transmissions the beamforming vectors at the transmitting station and at the receiving station are varied on the basis of a transmit estimate matrix $E_T$, and a receive estimate matrix $E_R$, wherein each element of an estimate matrix defines the beamforming weight for a specific antenna from the antenna group used during a specific test transmission, and determining from all test transmissions the beamforming channel matrix, wherein the transmit and receive estimate matrices $E_T$, $E_R$ are defined as follows:

$$E_R = B_R \otimes 1_{1,M},$$

$$E_T = 1_{1,N} \otimes B_T,$$

wherein:
$E_T$=transmit estimate matrix,
$B_T$=base transmit estimate matrix having the dimension M×M for the transmitting station having M transmit antennas and having beamforming weights for the transmitting station,
$E_R$=receive estimate matrix,
$B_R$=base receive estimate matrix having the dimension N×N for the receiving station having N receive antennas and having beamforming weights for the receiving station,
$1_{1,N}$=a row vector having N elements that are equal 1, and
$1_{1,M}$=a row vector having M elements that are equal 1,
wherein $[E_T]_{m,k}$ describes a beamforming weight for the m-th transmit antenna during the k-th test transmission of N·M test transmissions,
wherein $[E_R]_{n,k}$ describes a beamforming weight for the n-th receive antenna during the k-th transmission of the N·M test transmissions, and
wherein the beamforming channel matrix is estimated based on the base transmit estimate matrix $B_T$, the base receive estimate matrix $B_R$ and the received test signal.

Another embodiment may have a computer program having instructions for performing a method for determining a beamforming vector $w_{CH}$ of an antenna group of a transmitting station in a wireless communication system and a beamforming vector $z_{CH}$ of an antenna group of a receiving station in the wireless communication system, wherein each of the transmitting station and the receiving station includes a codebook $C_T$, $C_R$ having a plurality of predefined beamforming vectors w, z, when executing the instructions by a computer, which method may have the steps of: determining from the codebook $C_T$ of the transmitting station the transmit beamforming vector $w_{CH}$ yielding a first predefined result when applying the beamforming weights defined in the beamforming vectors w from the codebook $C_T$ of the transmitting station to a known beamforming channel matrix H describing the radio channel between the transmitting station and the receiving station, and determining from the codebook $C_R$ of the receiving station the receive beamforming vector $z_{CH}$ yielding a second predefined result when applying the beamforming weights defined in the beamforming vectors z from the codebook $C_R$ of the receiving station to a combination of the known beamforming channel matrix H and the determined transmit beamforming vector $w_{CH}$, or determining from the codebook $C_R$ of the receiving station the receive beamforming vector $z_{CH}$ yielding a first predefined result when applying the beamforming weights defined in the beamforming vectors z from the codebook $C_R$ of the receiving station to a known beamforming channel matrix H describing the radio channel between the transmitting station and the receiving station, and determining from the codebook $C_T$ of the transmitting station the transmit beamforming vector $w_{CH}$ yielding a second predefined result when applying the beamforming weights defined in the beamforming vectors w from the codebook $C_T$ of the transmitting station to a combination of the known beamforming channel matrix H and the determined receive beamforming vector $z_{CH}$.

Another embodiment may have a computer program having instructions for performing a method for determining a beamforming vector for a transmitting station in a wireless communication system and a beamforming vector for a receiving station in the wireless communication system, wherein both the transmitting station and the receiving station include a hybrid MIMO beamforming configuration having a plurality of MIMO branches, each MIMO branch having a plurality of antennas, when executing the instructions by a computer, which method may have the steps of: splitting the hybrid MIMO beamforming system into a plurality of subsystems, each subsystem having at least one MIMO transmit branch on the transmitting side and at least one MIMO receive branch on the receiving side, and determining the beamforming parameters for each subsystem separately.

In accordance with an embodiment of the first aspect of the invention, the transmission characteristics may be determined at the receiving station, and the transmitting station is informed about the beamforming vector determined from the beamforming vector pair, for example by sending the determined beamforming vector or an information identifying the determined beamforming vector from the receiving station to the transmitting station.

In accordance with a further embodiment of the first aspect of the invention the wireless communication system may comprise a plurality of stations allowing for a bidirectional transmission there between, wherein the method is performed for both directions for obtaining for the station a transmit beamforming vector when the station operates as a transmitter station, and for obtaining a receive beamforming vector, when the station operates as a receiving station. In accordance with the embodiments a station may operate using a frequency division duplex (FDD) technique so that the station may simultaneously transmit and receive signals. Also in such embodiments the method in accordance with the first aspect is performed for both the transmitting part and the receiving part. In accordance with another embodiment of the first aspect, the wireless communication system comprises a plurality of stations allowing for a bidirectional transmission there between, wherein a station uses the same antennas for transmitting and receiving, and wherein a beamforming vector determined for the station is used both for transmitting and receiving.

In accordance with an embodiment of the first aspect of the invention, the beamforming vectors of the transmitting and receiving stations are provided in respective codebook matrices of the transmitting and receiving stations, and the training matrices for the transmitting and receiving stations are provided, wherein training matrix for the transmitting station comprises $K_R$-times the beamforming vectors of the transmitting station, $K_R$ being the number of beamforming vectors in the codebook of the receiving station, and wherein the training matrix for the receiving station comprises $K_T$-times the beamforming vectors of the receiving station, $K_T$ being the number of beamforming vectors in the codebook of the transmitting station. In accordance with this embodiment, the order of the beamforming vectors in the training matrices is selected such that each beamforming vector from the codebook of the transmitting station encounters all beamforming vectors from the codebook of the receiving station.

In accordance with an embodiment of the first aspect of the invention, the transmission characteristics comprises a receive power, a signal-to-noise ratio (SNR), a signal-to-interference ratio (SIR), and a signal to interference-plus-noise ratio (SINR), and the predefined value comprises a maximum of the receive power, of the signal-to-noise ratio (SNR), of the signal-to-interference ratio (SIR), and of the signal to interference-plus-noise ratio (SINR).

In accordance with an embodiment of the second aspect of the invention, an estimate matrix may comprise the beamforming vectors for the transmitting station and the receiving station, respectively, in chronological order and starting at column 1, wherein the estimate matrix for the transmitting and receiving stations is determined on the basis of a base estimate matrix for the transmitting and receiving stations. In general there is a matrix for the transmitter and a matrix for the receiver which are different. However, in accordance with embodiments, in specific cases the matrices for the transmitter and the receiver are identical. The base estimate matrix may comprise the beamforming weights and may be a square matrix. In accordance with embodiments, the base estimate matrix comprises all beamforming vectors used for an estimation at the transmitter/receiver only once. Further, the wireless communication system may use equal-gain beamforming, and the base estimate matrix may be a unitary matrix. The unitary base estimate matrix may be a Hadamard matrix, a matrix having four equidistant phase states, a matrix having $\sqrt{N}$ equidistant phase states, or a matrix having N equidistant phase states.

In accordance with another embodiment of the second aspect of the invention, the wireless communication system may comprise a plurality of stations allowing for a bidirectional transmission there between, wherein the method is performed for both directions for obtaining for the station a transmit beamforming channel matrix when the station operates as a transmitting station, and for obtaining a receive beamforming channel matrix when the station operates as a receiving station. In accordance with yet another embodiment of the second aspect of the invention, the wireless communication system may comprise a plurality of stations allowing for a bidirectional transmission there between, wherein a station uses the same antennas for transmitting and receiving, and wherein a beamforming channel matrix determined for the station is used both for transmitting and receiving.

In accordance with an embodiment of the third aspect of the invention for determining the beamforming vectors an optimization method or a search across all beamforming vectors of the respective codebook is made.

In accordance with an embodiment of the third aspect of the invention, the wireless communication system may comprise a plurality of stations allowing for a bidirectional transmission there between, wherein the method is performed for both directions for obtaining for the station a transmit beamforming vector when the station operates as a transmitting station, and for obtaining a receive beamforming vector when the station operates as a receiving station. In another embodiment of the third aspect of the invention, the wireless communication system may comprise a plurality of stations allowing for a bidirectional transmission there between, wherein a station uses the same antennas for transmitting and receiving, and wherein a beamforming vector determined for the station is used both for transmitting and receiving.

In accordance with an embodiment of the fourth aspect of the invention, both the transmitting station and the receiving station may comprise a hybrid MIMO beamforming configuration. In accordance with this embodiment, splitting the hybrid MIMO beamforming system into a plurality of beamforming subsystems may comprise the assignment of each MIMO transmit branch to a MIMO receive branch and each MIMO receive branch to a MIMO transmit branch, wherein this may comprise assigning the branches such that a number of MIMO receive branches assigned to the same MIMO transmit branch, or a number of MIMO transmit branches assigned to the same MIMO receive branch is minimal. In accordance with another embodiment of the fourth aspect of the invention, the branches may be assigned such that in case a plurality of MIMO receive branches is allocated to the same MIMO transmit branch, MIMO receive branches whose MIMO antennas are spatially as far as possible apart from one another are assigned to the same MIMO transmit branch, or assigning the branches is such that in case a plurality of MIMO transmit branches is allocated to the same MIMO receive branch, the MIMO transmit branches whose MIMO antennas are spatially as far as possible apart from one another are assigned to the same MIMO receive branch. Dependent on the MIMO signal processing, in accordance with embodiments, it may be advantageous to use not the MIMO branches having the most distant antennas but those MIMO branches having their antennas as close as possible.

In another embodiment of the fourth aspect of the invention the splitting of the hybrid MIMO beamforming system may comprise splitting the system into asymmetric subsystems comprising only one MIMO branch on the transmitting side or on the receiving side.

In accordance with an embodiment of the fourth aspect of the invention, the subsystems may be considered as beamforming systems and the beamforming parameters for each subsystem may be determined in accordance with one or more of the methods of the first, second and third aspects of the invention.

BRIEF DESCRIPTION OF THE DRAWINGS

Embodiments of the present invention will be detailed subsequently referring to the appended drawings, in which:

FIGS. 7(a) and 7(b) show examples for the static allocation of subsystems of the 2×2 MIMO system of FIG. 5.

DETAILED DESCRIPTION OF THE INVENTION

In the following the different aspects of the invention will be described. It is noted that the respective aspects, while being described separately may be used in combination, e.g. in a wireless communication system the beamforming parameters may be determined applying one or more of the subsequently described aspects (approaches).

In the subsequent description, the following notation is used: Small letters in italics (e.g. a) describe complex- or real-valued quantities, capital letters in italics (e.g. A) describe complex- or real-valued constants, bold small letters (e.g. a) describe complex or real valued vectors, and bold capital letters (e.g. A) describe complex- or real-valued matrices. The dimensions of a matrix having N rows and M columns is N×M. The k-th element of vector a is indicated by $[a]_k$, and $[A]_{n,m}$ is the element of the n-th row and m-th column of matrix A. A row vector having K elements that are each 1 is described as $1_{1,K}$, a matrix having N rows and M columns that are each 1 is describe as $1_{N,M}$. The transpose and hermitian of a matrix A are symbolized by $A^T$ and $A^H$. The Kronecker product between matrices or vectors is represented by $\otimes$. The abbreviation $A^{-1}$ represents the inverse matrix of A. A diagonal matrix having the values of the vector a on the diagonal is generated by diag(a). The operation $vec(H) = [[H]_{1,m} \ldots [H]_{N,m}]^T$ with m=[1 ... M] generates a column vector of length N·M from the joined rows of matrix H.

$1^{st}$ Aspect: Training with the Help of Complete Training Matrices

Figure 1:
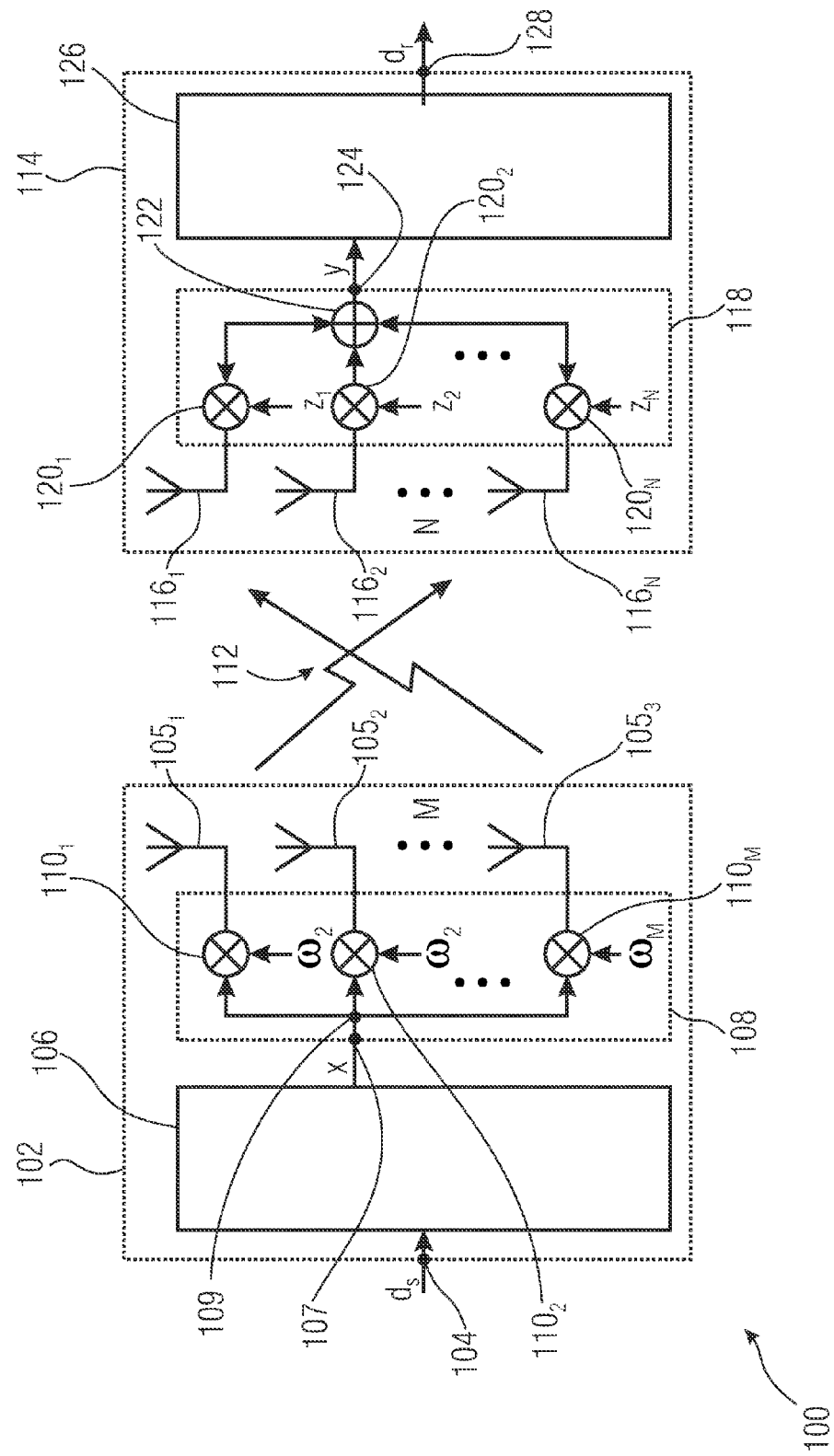
FIG. 1 is a schematic representation of an unidirectional wireless communication system using beamforming comprising M antennas at the transmitter and N antennas at the receiver.
Figure 1A:
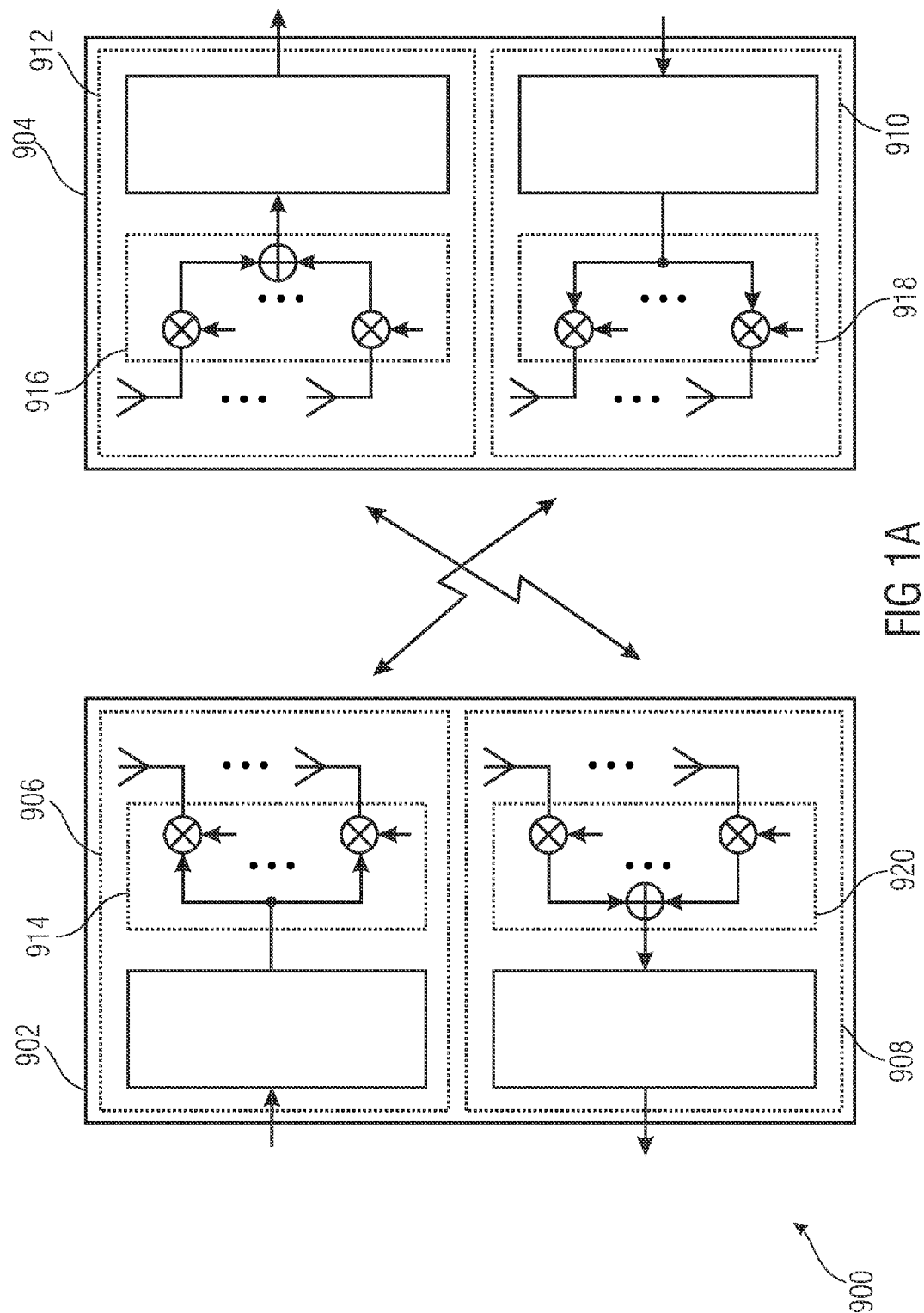
FIG. 1(a) is a is a schematic representation of a bidirectional wireless communication system using beamforming.

In the following, embodiments in accordance with the first aspect of the invention will be described. The first aspect of the invention, in accordance with embodiments, concerns the training of a beamforming system, as it is for example depicted in FIG. 1, using complete training matrices. A beamforming vector w for the antenna group 106 of the transmitter 102 shown in FIG. 1 is determined. Also, a beamforming z of the antenna group 116 of the receiver 114 of the wireless communication system 100 of FIG. 1 is determined. The transmitter 102 and the receiver 114 use respective codebooks, each including a plurality of predefined beamforming vectors. The transmit codebook of the transmitter 102 may be stored in a memory provided by the beamformer 108 of the transmitter 102. Alternatively, the codebook may be provided at another location inside or external from the transmitter 102. Likewise, a receive codebook for the receiver 114 may be stored in a memory of the beamformer 118 or may be provided somewhere else in the receiver 114 or may be provided from an external source. The wireless communication system 100 as shown in FIG. 1 is configured to perform a method for determining a beamforming vector for the respective antenna groups of the transmitting and receiving stations, as it is depicted and described in the following with regard to FIG. 2. The respective method steps may be implemented in the control circuitry of the overall system or may be part of the control circuitry of the respective beamformers 108 and 118.

Figure 2:
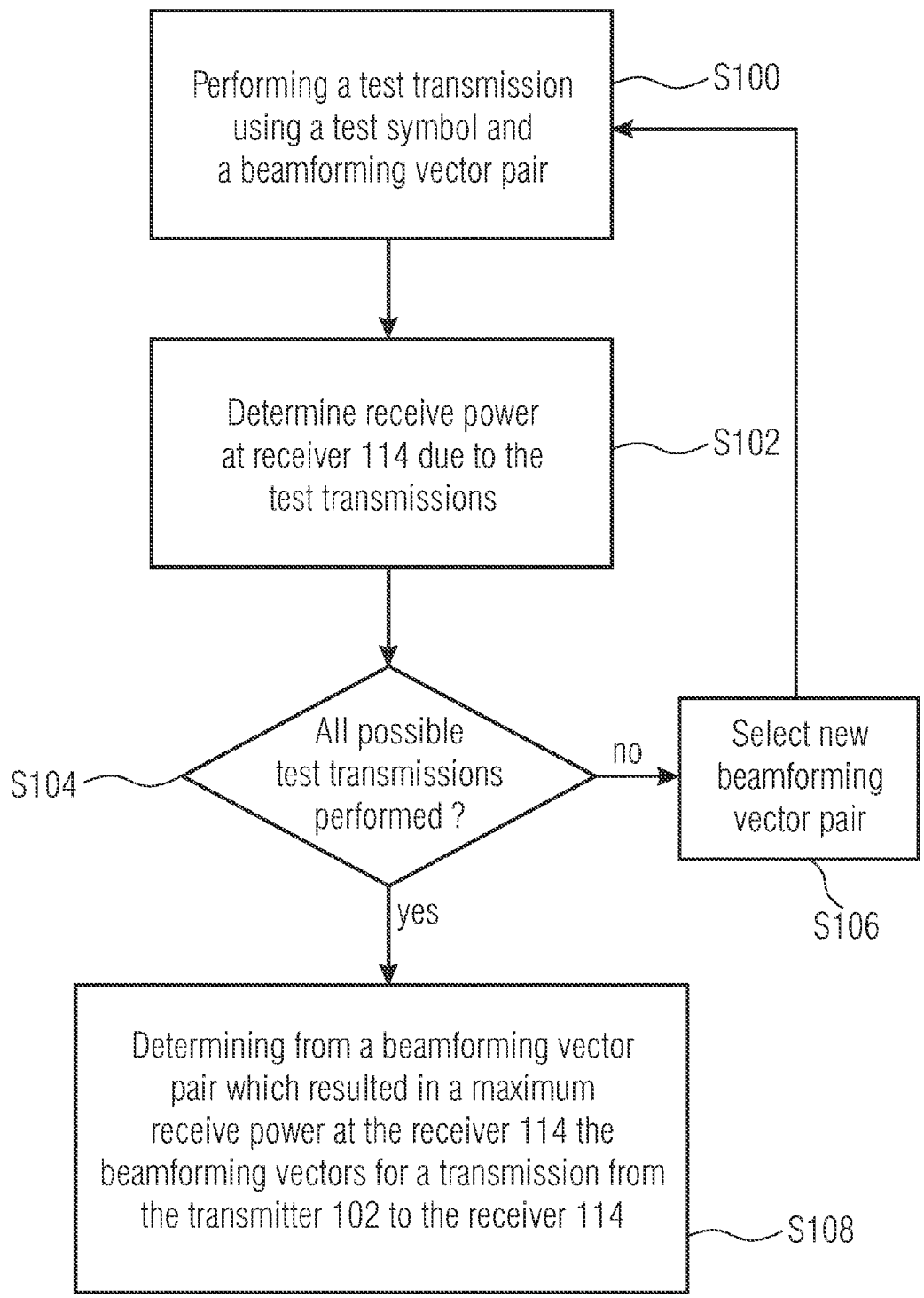
FIG. 2 is a flow diagram of an embodiment of the invention in accordance with the first aspect for determining beamforming vectors for the transmitting and receiving station.

FIG. 2 shows a flow diagram of an embodiment of the invention in accordance with the first aspect for determining a beamforming vector for the transmitting and receiving stations, in a first step S100 a test transmission from the transmitting station to the receiving station using a test signal or a test symbol and a beamforming vector pair is performed. The beamforming vector pair includes a beamforming vector selected from the codebook of the transmitting station 102 and a beamforming vector selected from the codebook of the receiving station 114. Following the test transmission in step S100, in step S102 a transmission characteristic, for example a receive power, a signal-to-noise ratio (SNR), a signal-to-interference ratio (SIR) or a signal to interference-plus-noise ratio (SINR), of the test transmission is determined at the receiving station 114. At step S104, following the determination of the receive power, the SNR, the SIR or the SINR for a test transmission, it is determined as to whether all possible test transmissions were performed or not. In case not all possible test transmissions were performed, a new beamforming vector pair is selected at step S106 and the method returns to step S100 for performing a test transmission using the new beamforming vector pair and the test signal. Thus, by means of steps S104 and S106 the test transmission and the determination of the transmission characteristic are repeated using different beamforming vector pairs. In accordance with an embodiment of the first aspect of the invention, the beamforming vectors in the beamforming vector pairs are selected such that each beamforming vector from the codebook of the transmitting station encounters all beamforming vectors from the codebook of the receiving station. Once all possible test transmissions were performed, e.g. all possible combinations of beamforming vectors from the transmitting station and from the receiving station were used for performing the test transmission the method proceeds to step S108, in accordance with which the beamforming vectors for the transmitting and receiving stations are determined from that beamforming vector pair for which the transmission characteristic, for example the receive power, the SNR, the SIR or the SINR at the receiver 114 had a predefined value, for example which of the beamforming vector pairs resulted in a maximum receive power, SNR, SIR or SINR at the receiver 114. In accordance with other embodiments, it is not necessary to evaluate the receive power, SNR, SIR or SINR after each step. Rather, the received test symbols may be recorded at the receiver and the evaluation of some or all of received test symbols and the selection may be done after all or a predefined number of test symbols has been transmitted.

The thus determined beamforming vectors are used for a transmission from the transmitter 102 to the receiver 114.

As just described, the 1$^{st}$ aspect of the invention relates to the use of suitable training matrices T, i.e. a specific selection and temporal sequence of beamforming vectors for the training. In accordance with embodiments, the method operates without knowledge of the beamforming channel matrix. It is assumed that the beamforming is performed based on codebooks. A codebook C is the (finite) magnitude of all possible and allowable beamforming vectors. Basically, an individual codebook may be defined for every antenna group in the system, however, group antennas having the same number of antenna elements may also use the same codebook. The codebook may also be expressed as codebook matrix C, into which the beamforming vectors of the codebooks are entered column by column. The selection of the codebook may be arbitrary, as long as the rows and columns of the codebook matrix are not linearly dependent. The maximum diversity gain, visible in the maximum increase of the bit error frequency curve for large signal/interference power intervals is obtained for unitary codebook matrices (see e.g. Love, D. J. and Heath, R. W., Jr., "Equal gain transmission in multiple-input multiple-output wireless systems", *Communications, IEEE Transactions on*, 51(7):1102-1110, 2003). In a unitary codebook matrix, all beamforming vectors (columns) are pairwise orthogonal and have the norm one (orthonormal). By adding further non-orthonormal beamforming vectors, additionally, antenna gain may be realized, which is expressed in an improvement of the signal-to-noise ratio. Further optimization criteria for codebooks are, for example, minimal phase numbers for equal-gain beamformers (see e.g. *ECMA-387 Standard: High Rate 60 GHz PHY, MAC and HDMI PAL*, 2008, Ecma International).

In the following, the codebook matrices for the transmitter 102 and the receiver 114 are referred to by $C_T$ and $C_R$, respectively. For a unidirectional transmission between the two stations 102 and 114 two different training matrices are provided: The matrix $T_T$ for beamforming at the transmitter 102, and the matrix $T_R$ for beamforming at the receiver 114. The matrices $T_T$ and $T_R$ form a matrix pair. Each of the matrices of the matrix pair has the same number of columns. If the codebook of the transmitter 102 includes $K_T$ vectors and the codebook of the receiver 114 includes $K_R$ vectors, the training matrices $T_T$ and $T_R$ will each have $K_T \cdot K_R$ columns. The vectors of the codebook of the transmitter 102 are included $K_R$-times in the training matrix $T_T$ of the transmitter. In the same way, for the receiver 114, the training matrix $T_R$ includes the vectors of the codebook of the receiver 102 $K_T$-times.

For the training, the beamforming vectors for the transmitter 102 and for the receiver 114 are each taken column by column, starting with column 1, successively from the respective training matrices, and the test transmission using suitable training signals or training symbols is performed. Hence, for the training, $K_T \cdot K_R$ beamforming configurations and test transmissions may be used. The method in accordance with this aspect is based on selecting the order of beamforming vectors in the training matrices such that every vector from the codebook of the transmitter 102 encounters all vectors from the codebook of the receiver 114—and vice versa. In accordance with an embodiment, a simple design rule for obtaining the training matrices may be stated using the Kronecker product. A matrix pair $T_T$, $T_R$ may be calculated as follows:

$$T_T = 1_{1,K_R} \otimes C_T, \quad (1)$$

$$T_R = C_R \otimes 1_{1,K_T} \quad (2)$$

Equations (1) and (2) may be exchanged, which means $T_T = C_T \otimes 1_{1,K_R}$, $T_R = 1_{1,K_T} \otimes C_R$. Also, simultaneously exchanging columns in $T_T$ and $T_R$ is possible.

In accordance with an embodiment, in a bidirectional transmission, the method is performed for both directions according to the duplex method used in the system. Every station may use both transmitting and receiving beamforming vectors and a training matrix $T_T$ for the transmitter or for the receiver $T_R$. The training is then performed separately for both directions of transmission, wherein the respective matrix pairs of training matrices are used. In accordance with an embodiment, a station may use the same antennas for transmitting and receiving. In such an embodiment the beamforming vectors for one direction of transmission may be determined and used also in the other direction of transmission.

After the complete run of all test transmissions, those beamforming vectors on the transmitter side and on the receiver side for which the highest received power, SNR, SIR or SINR has been obtained during the training phase are obtained. These beamforming vectors are optimal for the selected codebooks at transmitter 102 and at the receiver 114, independent of the used data transmission method. In accordance with embodiments, the optimization may take place at the receiver 114 so that the determined transmitting beamforming vector (codebook entry) has to be transmitted to the transmitter 102. The method in accordance with the first aspect determining optimal beamforming vectors for the transmitter 102 and for the receiver 114 in a single training phase—without any iterative feedbacks from the receiver 114 to the transmitter 102.

Embodiments in accordance with the first aspect are advantageous, since for the training of the transmitting and receiving beamformers 108 and 118 (unidirectional), the transmission of training symbols in one direction is sufficient using the respective training matrix pair. Consequently, for a complete training of the beamformers 108, 118, for both directions of transmission (bidirectional), only a single transmission in each direction (station 102 to station 114 as well as station 114 to station 102) may be used. The method allows not only determining particularly suitable adjustments but allows for the determination of optimal beamformer adjustments with respect to the codebooks and the chosen optimization criterion (e.g. received power, SNR, SIR, SINR). Optimizing the beamformer weights by several transmissions in both directions and iterative adoption of the weights is omitted. The training is simplified, accelerated and the performance of the data transmission system is maximized. If small-scale codebooks are used, the method is also interesting for mobile applications with quickly changing radio channels.

2$^{nd}$ Aspect: Estimating the Beamforming Channel Matrix

Subsequently, embodiments of the second aspect of the invention are described, in accordance with which a beamforming channel matrix is estimated without side information and without MIMO signal processing. Again, a wireless communication system 100 as depicted in FIG. 1 is assumed, and a beamforming channel matrix is to be determined which describes the radio channel 112 between the transmitter 102 and the receiver 114. The transmitter 102 and the receiver 114 comprise the respective antenna groups $106_1$ to $106_M$ and $116_1$ to $116_N$. Further, as already described above with regard to the first aspect, respective codebooks for the transmitter 102 and 114 are provided, each of the codebooks comprising a plurality of predetermined beamforming vectors for the antenna group of the transmitter 102 or for the antenna group of the receiver 114.

Figure 3:
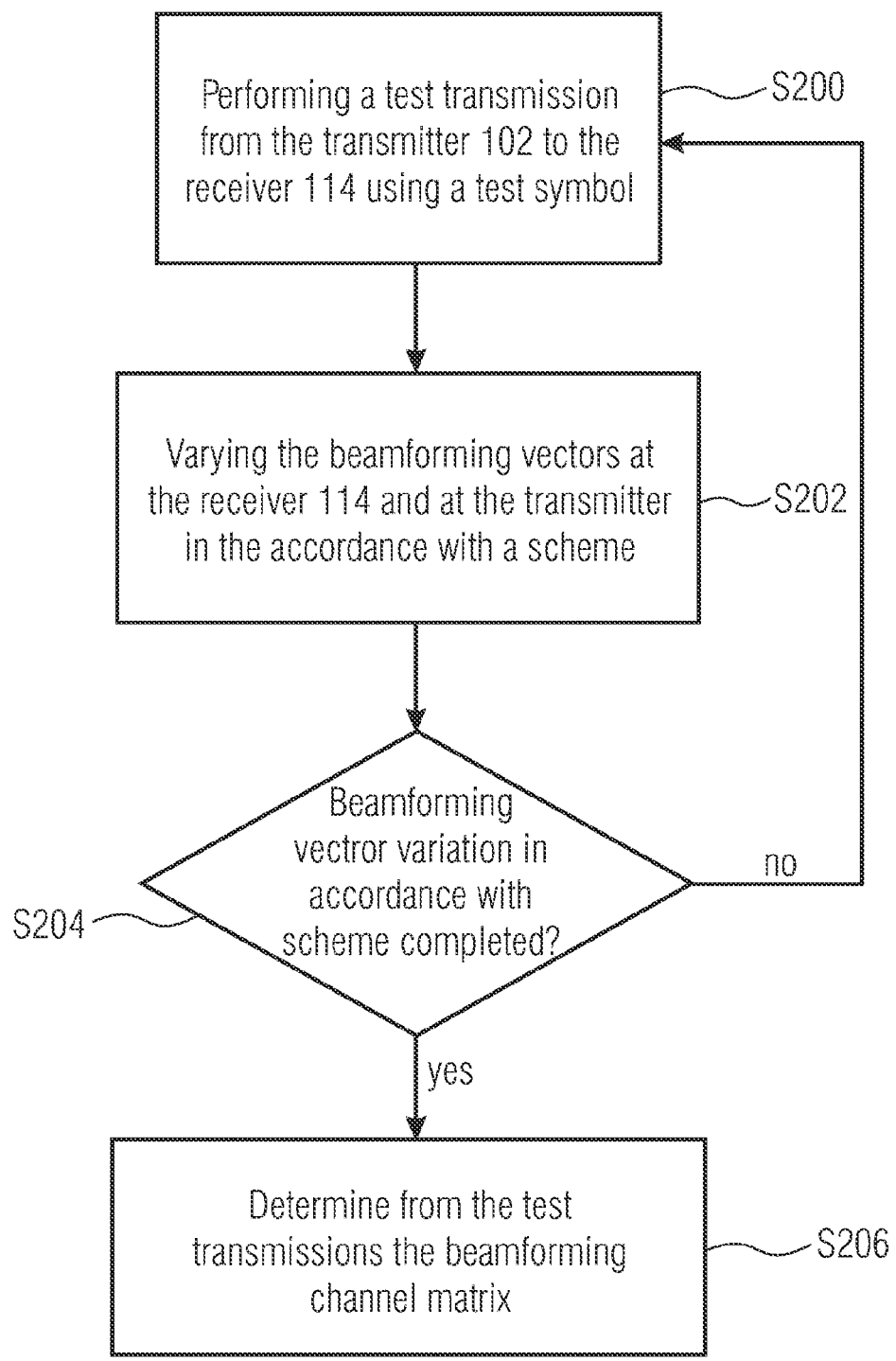
FIG. 3 is a flow diagram showing the respective steps of a method in accordance with embodiments of the second aspect of the invention for determining a beamforming channel matrix of a channel between the transmitting and receiving stations.

FIG. 3 is a flow diagram showing the respective steps of a method in accordance with embodiments of the second aspect of the invention. In a first step S200 a test transmission from the transmitter 102 to the receiver 114 using beamforming vectors for the receiver and for the transmitter and using a test symbol is performed. At step S202 the beamforming vectors at the receiver and at the transmitter are varied in accordance with a scheme, wherein in accordance with embodiments of the invention, the scheme allows for a variation of the beamforming vectors at the transmitting station and at the receiving station on the basis of a transmit estimate matrix and a receive estimate matrix, wherein each element of an estimate matrix defines the beamforming weight for a specific antenna form the antenna group used during a specific test transmission. Basically the approach in accordance with the second aspect is similar to the first approach except that other matrices are used. For each new beamforming setup a test symbol is transmitted. At step S204 it is determined as to whether a variation of the beamforming vectors in accordance with a scheme was completed. In case it was not completed, the method returns to step S200 and performs the next test transmission on the basis of the varied beamforming vectors. Otherwise, in case the beamforming vector variation was completed, the method proceeds to step S206 and the beamforming channel matrix is determined from the test transmissions.

As just described, the 2$^{nd}$ aspect of the invention relates to a method for estimating the beamforming channel matrix H without side information and without MIMO signal processing. In a system with M transmitting antennas 106 and N receiving antennas 116, N·M test transmissions may be used. The beamforming channel matrix H has M columns and N rows, and the element $[H]_{n,m}=h_{n,m}$ describes the transmission from the transmitting antenna m to the receiving antenna n:

$$H = \begin{pmatrix} h_{1,1} & \cdots & h_{1,M} \\ \vdots & \ddots & \vdots \\ h_{N,1} & \cdots & h_{N,M} \end{pmatrix} \quad (3)$$

The beamforming channel matrix H is estimated by performing several test transmissions, i.e. transmitting several estimation symbols subsequently, while varying the beamforming vectors at the transmitter 102 and at the receiver 114 according to a specific scheme. In accordance with an embodiment, the scheme may be described mathematically using two matrices, a transmitting estimation matrix $E_T$ and an associated receiving estimation matrix $E_R$. In accordance with this embodiment, the transmitting estimation matrix $E_T$ includes the beamforming vectors for the transmitter 102 as column entries in chronological order, beginning with column 1. $E_T$ is derived from a base transmitting estimation matrix $B_T$. For a beamforming system having M transmitting antennas, the base transmitting estimation matrix $B_T$ has the dimension M×M. The transmitting estimation matrix $E_T$ may be defined using the Kronecker product:

$$E_T = 1_{1,N} \otimes B_T. \quad (4)$$

It follows that the transmitting estimation matrix $E_T$ has the dimension M×NM, and that the element $[E_T]_{m,k}$ (=value in the m-th row and at the k-th column of the transmitting estimation matrix $E_T$) describes the beamforming weight for the m-th transmitting antenna 106 in the k-th of N·M transmissions.

The receiving estimation matrix $E_R$ includes the beamforming vectors for the receiver 114. The receiving estimation matrix $E_R$ is also derived from a base receiving estimation matrix $B_R$, wherein the base receiving estimation matrix $B_R$ has the dimension N×N for a system having N receiving antennas:

$$E_R = B_R \otimes 1_{1,M}. \quad (5)$$

It follows that the receiving estimation matrix $E_R$ has the dimension N×NM, and that the element $[E_T]_{n,k}$ (=value in the n-th row and at the k-th column of the receiving estimation matrix $E_R$) describes the weight for the n-th receiving antenna 116 in the k-th transmission. The base estimation matrices $B_T$ and $B_R$ for the transmitter 102 and for the receiver 114 may be selected to be the same or different.

In the k-th transmission, a training symbol $x_k=[x]_k$ is transmitted, and the symbol $y_k=[y]_k$ is received at the receiver 114.

In accordance with an embodiment, the beamforming channel matrix is estimated as follows. All transmissions may be presented in matrix vector notation as follows:

$$y = SXh \quad (6)$$

wherein X=diag(x) includes the transmitting vector x. The matrix S includes the base estimation matrices according to $$S = (B_R \otimes B_T)^T \quad (7)$$

and h=vec(H) is the vectorized channel matrix H. Using the transmission coefficient $d_k=[d]_k$ for every training symbol $$d = X^{-1}y \quad (8)$$

equation (6) reads as follows $$d = Sh. \quad (9)$$

The estimation of the beamforming channel matrix or is performed by:

$$h = S^{-1}d. \quad (10)$$

Since the matrix S is independent of the channel H and previously known, $S^{-1}$ may be calculated and stored in advance, such that equation 10 may be implemented efficiently. In accordance with embodiments, unitary matrices are used for the base estimation matrices, and S is also unitary and the following applies for equation 10:

$$h = S^H d. \quad (11)$$

In accordance with embodiments, for the base estimation matrices $B_T$ and $B_R$, basically, any square matrices or codebooks may be used, as long as the elements are valid settings for the beamforming weights $w_m=[w]_m$ or $z_n=[z]_n$ and the matrices have full rank, i.e. the rows or the columns are not linearly dependent. In the case of equal-gain beamforming, the beamforming weights only differ in phase and the implementation of the beamforming signal processing in accordance with embodiments allows only a discrete number of equidistant phase states. For channel estimation matrices, only certain phase states are possible and low phase numbers are generally advantageous.

In accordance with further embodiments, regarding the magnitude, unitary matrices have the same eigenvalues and are hence optimal with respect to a low estimation error in error-prone transmissions. Above that, unitary matrices, may be inverted in an particularly easy manner. Embodiments of the invention suggest the following unitary matrices for equal-gain beamforming:

1. Hadamard matrices having the two phase states $\{0, \pi\}$ corresponding to beamformer weights $\{1, -1\}$. Hadamard matrices of the dimensions N×N are known for N=2 or N=4k with k∈N.
2. Matrices having four equidistant phase states $\{0, \pi, \pi/2, -\pi/2\}$ corresponding to beamformer weights $\{1, -1, j, -j\}$ and $j=\sqrt{-1}$. These matrices cannot only be stated for N=4k with k∈N but also for further even N.
3. Matrices having $\sqrt{N}$ equidistant phase states may be stated for all N forming a square number by the cyclical shift (Töplitzmatrix) of a minimum-phase uniform sequence having perfect periodical autocorrelation.
4. Matrices having N equidistant phase states may be constructed for all N. For this, DFT matrices may be used.

In accordance with other embodiments, the unitarity of the base estimation matrices may be abandoned and suitable matrices may be determined by selecting certain rows and columns from suitable larger matrices. For example, from a Hadamard matrix that is larger than the desired base estimation matrix, smaller matrices having two phase states may be derived.

Basically, the estimation method may also be performed using non-square base estimation matrices. In such a case, $B_T$ and $B_R$ include more columns than rows and the determination of the vector h is performed with an over determined equation system. The over determined equation system may be solved according to the criterion of least error squares, and the estimation accuracy may be improved in case the transmission is interfered by noise. However, correspondingly more test transmissions may be used.

If beamforming is used for both directions of transmission, the method is generally performed for both directions, i.e. one beamforming channel matrix for each direction is determined. In case the same antennas are used for transmitting and receiving at a station, estimating the channel matrix for one direction of transmission may be sufficient. The beamforming channel matrix derived may be used both for transmitting and for receiving.

In the following some examples for unitary base estimation matrices are given:

Matrices Having Two Phase States:

Lists of Hadamard matrices for N=4k with k∈N are available in mathematical literature, example for N=8:

$$B = \sqrt{\frac{1}{8}} \begin{pmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{pmatrix} \quad (12)$$

Matrices Having Four Phase States:

Matrices having four phase states are described for all even N with N≤16 (see e.g. http://chaos.if.uj.edu.pl/~karol/hadamard/), example for N=8:

$$B = \sqrt{\frac{1}{8}} \begin{pmatrix} 1 & 1 & 1 & 1 & 1 & 1 & 1 & 1 \\ 1 & j & -1 & -j & 1 & j & -1 & -j \\ 1 & j & 1 & -1 & 1 & -1 & 1 & -1 \\ 1 & -j & -1 & j & 1 & -j & -1 & j \\ 1 & 1 & 1 & 1 & -1 & -1 & -1 & -1 \\ 1 & j & -1 & -j & -1 & -j & 1 & j \\ 1 & -1 & 1 & -1 & -1 & 1 & -1 & 1 \\ 1 & -j & -1 & 1 & -1 & j & 1 & -1 \end{pmatrix} \quad (13)$$

Matrices Having $\sqrt{N}$ Phase States:

Matrices having $\sqrt{N}$ phase states may be generated by cyclically shifting from Frank sequences (see e.g. Frank, R. and Zadoff, S. and Heimiller, R. Phase shift pulse codes with good periodic correlation properties. *Information Theory (Corresp.), IRE Transactions on*, 8(6):381-382, 1962), example for N=16:

$$B = \frac{1}{4} \begin{pmatrix} 1 & j & -1 & -j & 1 & -1 & 1 & -1 & 1 & -j & -1 & j & 1 & 1 & 1 & 1 \\ 1 & 1 & j & -1 & -j & 1 & -1 & 1 & -1 & 1 & -j & -1 & j & 1 & 1 & 1 \\ 1 & 1 & 1 & j & -1 & -j & 1 & -1 & 1 & -1 & 1 & -j & -1 & j & 1 & 1 \\ 1 & 1 & 1 & 1 & j & -1 & -j & 1 & -1 & 1 & -1 & 1 & -j & -1 & j & 1 \\ 1 & 1 & 1 & 1 & 1 & j & -1 & -j & 1 & -1 & 1 & -1 & 1 & -j & -1 & j \\ j & 1 & 1 & 1 & 1 & 1 & j & -1 & -j & 1 & -1 & 1 & -1 & 1 & -j & -1 \\ -1 & j & 1 & 1 & 1 & 1 & 1 & j & -1 & -j & 1 & -1 & 1 & -1 & 1 & -j \\ -j & -1 & j & 1 & 1 & 1 & 1 & 1 & j & -1 & -j & 1 & -1 & 1 & -1 & 1 \\ 1 & -1 & -j & j & 1 & 1 & 1 & 1 & j & -1 & -j & 1 & -1 & 1 & -1 \\ -1 & 1 & -j & -1 & j & 1 & 1 & 1 & 1 & j & -1 & -j & 1 & -1 & 1 \\ 1 & -1 & 1 & -j & -1 & j & 1 & 1 & 1 & 1 & j & -1 & -j & 1 & -1 \\ -1 & 1 & -1 & 1 & -j & -1 & j & 1 & 1 & 1 & 1 & j & -1 & -j & 1 \\ 1 & -1 & 1 & -1 & 1 & -j & -1 & j & 1 & 1 & 1 & 1 & j & -1 & -j \\ -j & 1 & -1 & 1 & -1 & 1 & -j & -1 & j & 1 & 1 & 1 & 1 & j & -1 \\ -1 & -j & 1 & -1 & 1 & -1 & 1 & -j & -1 & j & 1 & 1 & 1 & 1 & j \\ j & -1 & -j & 1 & -1 & 1 & -1 & 1 & -j & -1 & j & 1 & 1 & 1 & 1 \end{pmatrix} \quad (14)$$

Matrices Having N Phase States:

The descriptive matrices of the discrete Fourier transformation (DFT matrices) may be used as base estimation matrices having N phase states, by cyclically shifting or by permuting rows and columns, further base estimation matrices having the same characteristics may be generated. Example for N=8:

$$B = \sqrt{\frac{1}{8}} \begin{pmatrix} 1 & 1 & 1 & 1 & 1 & 1 & 1 & 1 \\ 1 & \sqrt{\frac{1}{2}}-j\sqrt{\frac{1}{2}} & -j & -\sqrt{\frac{1}{2}}-j\sqrt{\frac{1}{2}} & -1 & -\sqrt{\frac{1}{2}}+j\sqrt{\frac{1}{2}} & j & \sqrt{\frac{1}{2}}+j\sqrt{\frac{1}{2}} \\ 1 & -j & -1 & j & 1 & -j & -1 & j \\ 1 & -\sqrt{\frac{1}{2}}-j\sqrt{\frac{1}{2}} & j & \sqrt{\frac{1}{2}}-j\sqrt{\frac{1}{2}} & -1 & \sqrt{\frac{1}{2}}+j\sqrt{\frac{1}{2}} & -j & -\sqrt{\frac{1}{2}}+j\sqrt{\frac{1}{2}} \\ 1 & -1 & 1 & -1 & 1 & -1 & 1 & -1 \\ 1 & -\sqrt{\frac{1}{2}}+j\sqrt{\frac{1}{2}} & -j & \sqrt{\frac{1}{2}}+j\sqrt{\frac{1}{2}} & -1 & \sqrt{\frac{1}{2}}-j\sqrt{\frac{1}{2}} & j & -\sqrt{\frac{1}{2}}-j\sqrt{\frac{1}{2}} \\ 1 & j & -1 & -j & 1 & j & -1 & -j \\ 1 & \sqrt{\frac{1}{2}}+j\sqrt{\frac{1}{2}} & j & -\sqrt{\frac{1}{2}}+j\sqrt{\frac{1}{2}} & -1 & -\sqrt{\frac{1}{2}}-j\sqrt{\frac{1}{2}} & -j & \sqrt{\frac{1}{2}}-j\sqrt{\frac{1}{2}} \end{pmatrix} \quad (15)$$

Embodiments in accordance with the second aspect of the invention are advantageous, since for estimating the beamforming channel matrix for one direction of transmission, one transmission phase using the respective estimation matrix pair is sufficient. For estimating the channel matrices for both transmission directions, one transmission phase for each direction (station 102 to station 114 as well as station 114 to station 102) may be used. The number of estimation symbols to be transmitted may be minimized and consequently also the period for which this transmission phase may be used.

3$^{rd}$ Aspect: Determining the Beamforming Vectors by Using the Beamforming Channel Matrix In the following, embodiments of the third aspect of the invention are described in further detail. In accordance with embodiments beamforming vectors are determined using the known beamforming channel matrix. Again, a wireless communication system as described with regard to FIG. 1 is assumed, and a beamforming vector of the antenna group 105 of the transmitter 102 as well as a beamforming vector of the antenna group 116 of the receiver 114 is determined. Again, as described above, the transmitter 102 and the receiver 114 comprise a codebook including a plurality of predefined beamforming vectors.

Figure 4:
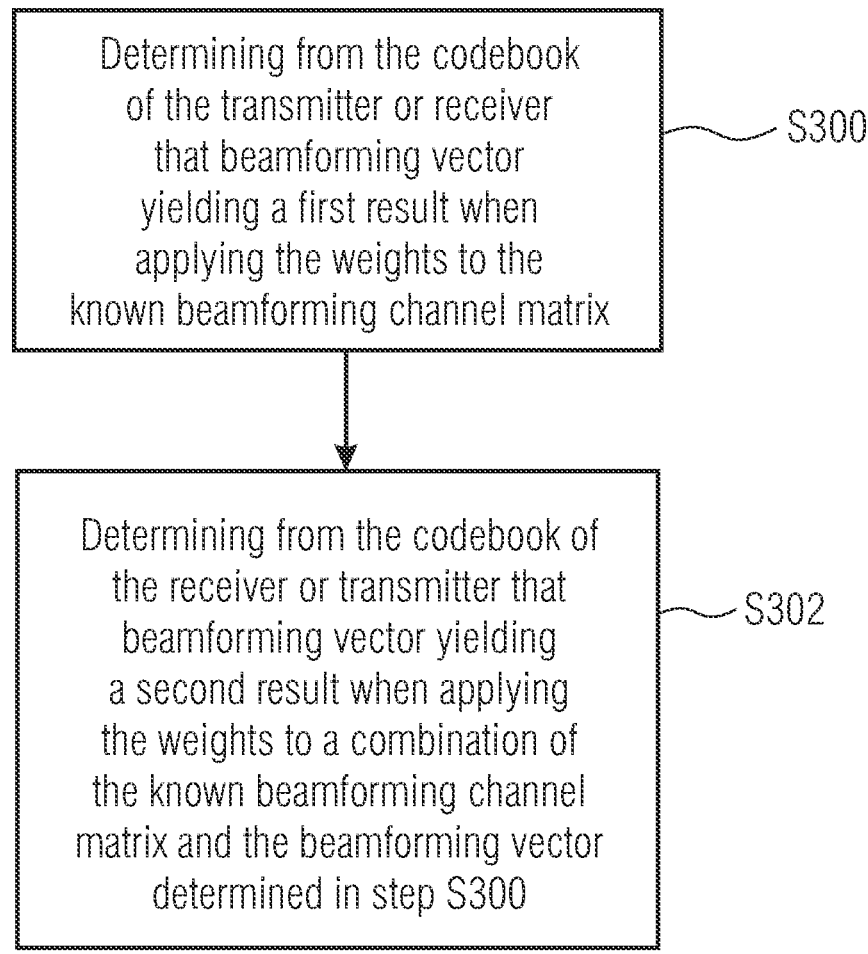
FIG. 4 is a flow diagram of an embodiment of the invention in accordance with the third aspect for determining beamforming vectors for the transmitting and receiving station.

FIG. 4 depicts a flow diagram of an embodiment of the invention in accordance with the just mentioned third aspect. In a first step S300 from the codebook of the transmitter 102 or from the codebook of the receiver 114 the beamforming vector is determined that yields a first predetermined result when applying the beamforming weights defined in the beamforming vector to a known beamforming channel matrix describing the radio channel 112 between the transmitter 102 and the receiver 114. In a subsequent step S302 for the receiver or the transmitter the beamforming vector is selected from the codebook, wherein that beamforming vector is selected that yields a second result when applying the weights of the selected beamforming vector to a combination of the beamforming channel matrix and the beamforming vector determined in the preceding step S300.

As just described, the 3$^{rd}$ aspect of the invention relates to the determination of the optimal beamforming vectors using beamforming channel matrix knowledge. The beamforming vectors for transmitter and receiver are determined based on the beamforming channel matrix H. Any codebooks C may be used. In accordance with an embodiment, the system use equal-gain beamforming at the transmitter 102 and at the receiver 114. In the following, the codebook for the transmitting beamformer 108 is referred to as $C_T$, and the codebook for the receiving beamformer 118 is referred to as $C_R$.

In accordance with an embodiment, the beamforming vectors are determined in two steps. In the first step, a beamforming vector $w_{CH}$ is determined for the transmitter 102, which optimizes the expression Hw according to the criterion of the L1 Norm $\| \|_1$ (also named Taxi Cab Norm or Manhattan Norm):

$$w_{CH} = \arg\max_{w \in C_T} \|Hw\|_1. \quad (16)$$

For determining $w_{CH}$, an optimization method may be used or a search across all vectors of the codebook $C_T$ may be performed.

In a second step, the beamforming vector z for the receiver 114 is determined. The term $z^T H w_{CH} = z^T h_{w,CH}$ is maximized according to the criterion of the largest absolute value. This may again be performed by a search across all vectors of the codebook $C_R$:

$$z_{CH} = \arg\max_{z \in C_R} |z^T H w_{CH}| \quad (17)$$

$$= \arg\max_{z \in C_R} |z^T h_{w,CH}| \quad (18)$$

Alternatively, $$z_H = \frac{1}{\sqrt{N}} \exp(-j \angle (Hw_{CH})) \quad (19)$$

may be determined and the vector having the maximum correlation with $z_H$ may be selected from the codebook:

$$z_{CH} = \arg\max_{z \in C_R} |z_H^H z| \quad (20)$$

The order in which the beamforming vectors are determined may be changed. In such a case, a reciprocal system is considered and the transmitting and receiving beamforming vectors are exchanged in the equations (exchanging w and z) and the transposed beamforming channel matrix (H→H$^T$) is used. In that manner, at first, a suitable receiving beamforming vector may be determined without considering the transmitting beamforming vector, and subsequently, a suitable transmitting beamforming vector considering the determined from the receiving beamforming vector.

In a bidirectional transmission system using beamforming in both directions of transmission, the method may be performed for both directions. In case the stations use the same antennas and beamformers for transmitting and receiving, determining the beamforming vectors for one direction of transmission may be sufficient. A beamforming vector may then be used both for transmitting and for receiving.

In a multi-carrier system having K subcarriers (K spectral components), basically, for every subcarrier k, a beamforming channel matrix H$^{(k)}$ may be determined:

$$H^{(k)} = \begin{pmatrix} h_{1,1}^{(k)} & \cdots & h_{1,M}^{(k)} \\ \vdots & \ddots & \vdots \\ h_{N,1}^{(k)} & \cdots & h_{N,M}^{(k)} \end{pmatrix} \quad (21)$$

In a system using MIMO signal processing, individual beamforming vectors would be determined for every subcarrier and adjusted separately. This is not possible in a system with beamforming signal processing, since only one beamforming vector may be adjusted for all spectral components. Therefore, in accordance with embodiments an easy-to-calculate solution is suggested. For determining the beamforming vectors the method is based only on the beamforming channel matrix having the highest modulus sum norm (sum of the absolute values of matrix entries):

$$H := H^{(l)} \quad (22)$$

with $$l = \arg \max_{1 \leq k \leq K} \sum_{n=1}^{N} \sum_{m=1}^{M} |h_{n,m}^{(k)}| \quad (23)$$

For reducing the effort further, only a sub range of the K channel matrices may be considered in (23):

$$l = \arg \max_{k \in K} \sum_{n=1}^{N} \sum_{m=1}^{M} |h_{n,m}^{(k)}| \quad (24)$$

with $$K \subset \{1, 2, \ldots K\}. \quad (25)$$

In that way, for example, only every second subcarrier may be considered. The further steps for determining the beamforming vectors starting from H correspond to the above described method.

Embodiments in accordance with the third aspect are advantageous, since suitable beamforming vectors are determined based on the estimated beamforming channel matrix. The gain obtainable for a given system by beamforming depends, apart from the hardware, on the performance of the algorithms used. With a suitable algorithm, not only particularly suitable but optimal beamformer settings with respect to the codebooks may be determined. A time-consuming training phase and/or iterative optimization of the beamforming vectors by repeated transmission of training symbols are not required. Hence, the method may operate quickly and transmission resources are saved. It is of particular interest for large-scale codebooks, since the number of useful estimation symbols does not depend on the scale of the codebook but merely on the number of the transmitting and receiving beamformer branches.

Beamforming vectors may also be determined for a multi-carrier system based on an individual beamforming channel matrix. This reduces the computational overhead. At the same time, the selection criterion ensures that the vectors are optimized for a suitable carrier. In that way, higher gains are possible by beamforming, compared to the use of a fixed carrier. After the selection of the channel matrix, any method may be used for determining the beamforming vectors that are based on the knowledge of the channel matrix.

Figure 5:
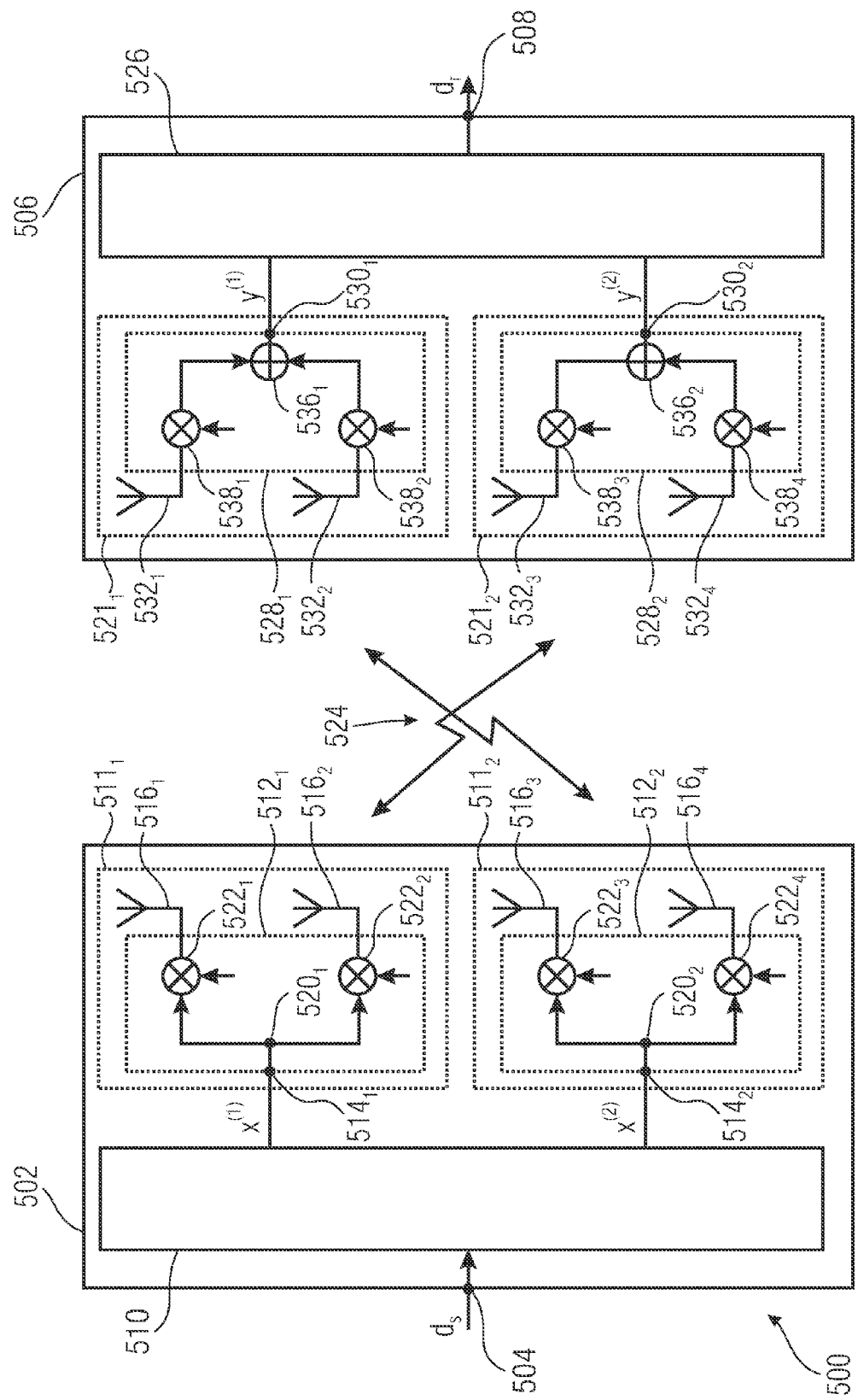
FIG. 5 is an example of a unidirectional hybrid MIMO beamforming system having two MIMO branches at the transmitter and at the receiver each having associated therewith two beamforming branches.

$4^{th}$ Aspect: Determining the Beamforming Vectors in a Hybrid MIMO Beamforming System In accordance with the embodiments of a fourth aspect of the invention an approach is described for determining the beamforming vectors in a hybrid MIMO beamforming system. FIG. 5 shows an example of a hybrid MIMO beamforming system having two MIMO branches at the transmitter and at the receiver each having associated therewith two beamforming branches. To be more specific, FIG. 5 shows a unidirectional radio system comprising a transmitter 502 having an input 504, and a receiver 506 having an output 508. The transmitter 502 comprises a transmitter signal processing unit 510, beamformers 512$_1$ and 512$_2$ having inputs 514$_1$ and 514$_2$, and antennas 516$_1$ to 516$_4$. The antennas 516$_1$ and 516$_2$ are connected to the beamformer 512$_1$ and form a first antenna group. Together with the beamformer 512$_1$ the antennas 516$_1$ and 516$_2$ form a first MIMO branch 511$_1$ of the transmitter 502. The antennas 516$_3$ and 516$_4$ are connected to the beamformer 512$_2$ and form a second antenna group. Together with the beamformer 512$_2$ the antennas 516$_3$ and 516$_4$ form a second MIMO branch 511$_2$ of the transmitter 502. The beamformer 512$_1$ comprises a splitting circuit 520$_1$ and two weighting elements 522$_1$ and 522$_2$. Also the beamformer 512$_2$ comprises a splitting circuit 520$_2$ and two weighting elements 522$_3$ and 522$_4$.

The data signal d$_s$ fed to the input 504 of the transmitter 502 is processed by the transmitter signal processing unit 510. In the transmitter signal processing unit 510 also the MIMO signal processing of the transmit signal takes place. The output transmission signal x$^{(1)}$ of the first MIMO branch 511$_1$ is fed via the input 514$_1$ into the beamformer 512$_1$, and is split using the splitting circuit 520$_1$. The split signal is subsequently weighted using the weighting elements 522$_1$ and 522$_2$, and is forwarded to the antennas 516$_1$ and 516$_2$. Likewise, the output transmission signal x$^{(2)}$ of the second MIMO branch 511$_2$ is fed via the input 514$_2$ of the beamformer 512$_2$ into the beamformer 512$_2$, and is split using the splitting circuit 520$_2$. The split signal is subsequently weighted using the weighting elements 522$_3$ and 522$_4$, and is forwarded to the antennas 516$_3$ and 516$_4$.

The signal radiated by the antennas 516$_1$ to 516$_4$ is transmitted via a radio channel and is received by a receiver 506. The receiver 506 comprises a receiver signal processing unit 526, beamformers 528$_1$ and 528$_2$ having outputs 530$_1$ and 530$_2$ and antennas 532$_1$ to 532$_4$. The antennas 532$_1$ and 532$_2$ are connected to the beamformer 528$_1$ and form an antenna group. Together with the beamformer 528$_1$ the antennas 532$_1$ and 532$_2$ form a first MIMO branch 521$_1$ of the receiver 506. The antennas 532$_3$ and 532$_4$ are connected to the beamformer 528$_2$ and also form an antenna group. Together with the beamformer $528_2$ the antennas $532_3$ and $532_4$ form a second MIMO branch $521_2$ of the receiver 506. The beamformer $528_1$ comprises an adding circuit $536_1$ and two weighting elements $538_1$ and $538_2$. Also the beamformer $528_2$ comprises an adding circuit $536_2$ and two weighting elements $538_3$ and $538_4$.

The signals received via the antennas $532_1$ and $532_2$ are fed to the beamformer $528_1$, are weighted by the weighting elements $538_1$ and $538_2$, and are added using the adding circuit $536_1$. At the output $530_1$ of the beamformer $528_1$ the signal $y_1$ of the first MIMO branch $521_1$ is present, which is input into the receiver signal processing unit 526. Likewise, the signals received via the antennas $532_3$ and $532_4$ are fed to the beamformer $528_2$, are weighted by the weighting elements $538_3$ and $538_4$, and are added using the adding circuit $536_2$. At the output $530_2$ of the beamformer $528_2$ the signal $y_2$ of the second MIMO branch $521_2$ is present, which is input into the receiver signal processing unit 526. In the receiver signal processing unit 526 the signals $y_1$ and $y_2$ are processed. In the receiver signal processing unit 526 also the MIMO signal processing of the receive signals occurs. At the output 508 of the receiver 506 the received data signal $d_r$ is present.

As just described, the 4th aspect of the invention relates to a multi-antenna radio system with MIMO signal processing. In every MIMO branch beamforming signal processing can be applied using a beamformer and an antenna group, which results in a hybrid MIMO beamforming configuration. The system has P MIMO branches at the transmitter 502 and Q MIMO branches at the receiver 506. Every MIMO transmitting branch p, p=1 ... P, comprises $M_p$ beamforming transmitting branches. Every MIMO receiving branch q, q=1 ... Q consists of $N_q$ beamforming receiving branches. FIG. 5 shows an example of a hybrid MIMO beamforming system 500 having the two MIMO branches $511_1$, $511_2$ at the transmitter 502 and the two MIMO branches $521_1$, $521_2$ at the receiver 506, wherein each of the beamformers $512_1$, $512_2$ and $528_1$, $528_2$ has two branches.

Figure 6:
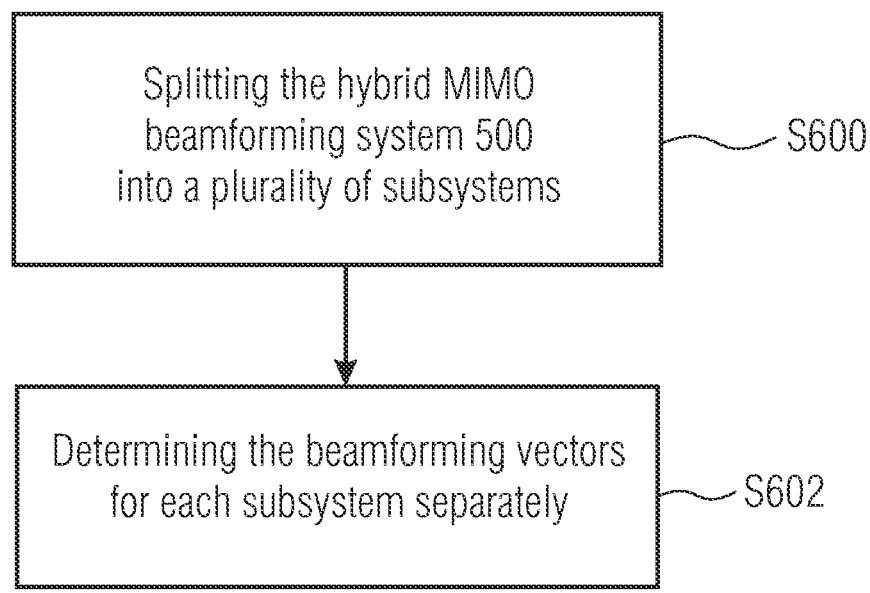
FIG. 6 is a flow diagram representing the steps of a method in accordance with the embodiments of the fourth aspect of the invention.

FIG. 6 depicts a flow diagram representing the steps of a method in accordance with the embodiments of the fourth aspect of the invention. The method is implemented, for example, by a system as described with regard to FIG. 5 and comprises as a first step S600 the splitting of the hybrid MIMO beamforming system into a plurality of subsystems. In a subsequent step S602 for each subsystem the beamforming vectors are determined separately.

In accordance with embodiments of the 4th aspect of the invention, a method for determining suitable beamforming vectors for hybrid MIMO beamforming systems having any number of MIMO branches at the transmitter and at the receiver is described. The basic idea is to suitably split the hybrid MIMO beamforming system into several subsystems. Then, for every subsystem, any known method for determining suitable beamforming parameters may be used. If the subsystems are beamforming systems or are considered as beamforming systems one or more of the above described methods in accordance with the $1^{st}$ to $3^{rd}$ aspect of the invention for determining suitable beamforming parameters may be used. Considering a subsystem with more than one MIMO branch at one side as beamforming system, means to assume for the optimization that the beamformers of all MIMO branches at this side form one large beamformer and that only beamforming signal processing can be applied.

For splitting an overall system, two approaches may be used.

In accordance with embodiments, the first approach comprises a fixed or static allocation, where the hybrid MIMO beamforming system is split into a plurality of beamforming subsystems. Every MIMO transmitting branch is allocated to one MIMO receiving branch, and every MIMO receiving branch is allocated to one MIMO transmitting branch. For optimizing the performance of the system, the following allocation rules are defined:
1. The allocation is performed "as evenly as possible", i.e. the number of MIMO receiving branches allocated to a MIMO transmitting branch or the number of MIMO transmitting branches allocated to a MIMO receiving branch is minimized.
2. The information on the spatial arrangement of the MIMO transmitting and receiving antennas are considered as follows: If several MIMO receiving branches are allocated to a MIMO transmitting branch (several MIMO transmitting branches to one MIMO receiving branch) those receiving branches are respectively allocated to a MIMO transmitting branch whose MIMO antennas are spatially as far as possible apart from one another (those transmitting branches are allocated to a MIMO receiving branch whose MIMO antennas are spatially as far as possible apart from one another). Dependent on the MIMO signal processing, in accordance with embodiments, it may be advantageous to use not the MIMO branches having the most distant antennas but those MIMO branches having their antennas as close as possible.

FIGS. 7(a) and (b) show examples for the static allocation on the basis of the MIMO beamforming system of FIG. 5. As can be seen, the hybrid 2×2 MIMO beamforming system is separated into two beamforming subsystems, and in accordance with the embodiment depicted in FIG. 7(a) a first beamforming subsystem 700 is formed of the MIMO branches $511_1$ of the transmitter 502 and the MIMO branch $521_1$ of the receiver 514. The second beamforming subsystem 702 comprises the second MIMO branch $511_2$ of the transmitter 502 and the second MIMO branch $521_2$ of the receiver 514. In the embodiment of FIG. 7(b) the first beamforming subsystem 704 comprises the first MIMO branch $511_1$ of the transmitter 502 and the second MIMO branch $521_2$ of the receiver 514. The second beamforming subsystem 706 comprises the second MIMO branch $511_2$ of the transmitter 502 and the first MIMO branch $521_1$ of the receiver 514.

By the allocation, the MIMO beamforming overall system is split into max(P, Q) beamforming subsystems. FIG. 7 illustrates the two options for splitting a hybrid MIMO beamforming system having two MIMO branches at the transmitter and at the receiver. For every beamforming subsystem, suitable beamforming vectors for the transmitter and the receiver are to be determined. For this purpose, the methods in accordance with the 1st to 3rd aspect described may be used.

In methods with training matrices (see the first aspect), the different beamforming subsystems are considered sequentially in any order. Thereby only the MIMO branches of the currently considered subsystem are active. Transmit branches that do not belong to the currently considered subsystem are turned off and receive branches that do not belong to the currently considered subsystem remain unconsidered. Only the training matrices of the currently considered subsystem are used.

In methods for determining beamforming vectors having channel knowledge (see the third aspect), only those beamforming channel submatrices describing each of the channels between the allocated MIMO branches have to be known. For the channel estimation, the subsystems may be considered sequentially in any order. Thereby, on the transmitter side, only the MIMO branch of the currently considered subsystem is active. Transmit branches that do not belong to the currently considered subsystem are turned off and receive branches that do not belong to the currently considered subsystem remain unconsidered.

In case there are more MIMO branches in the transmission system on the transmitter side than on the receiver side, or vice versa, for determining the beamforming vectors some MIMO branches are considered several times. For example, in case of three MIMO branches at the transmitter and two MIMO branches at the receiver, one MIMO branch of the receiver is considered twice. Since for each beamformer, finally, only one beamforming vector is used, two different approaches are suggested:

1. The beamforming vector determined while considering the MIMO branch for the first time is maintained. In case the same MIMO branch is considered again, this beamforming vector will only be used for optimizing the beamforming vector on the opposite side.
2. At the beginning no attention is paid to the fact whether MIMO branches are considered multiple times. Thus, for some MIMO branches a plurality of beamforming vectors are determined. From these vectors for each branch that beamforming vector is selected and maintained which provides the best performance in accordance with a predefined optimization criterion. Subsequently a new optimization of all those MIMO branches on the opposite side is done, which are associated with the currently considered MIMO branch and which in accordance with the predefined optimization criterion showed a worse performance. On the basis of the already determined beamforming vector only the respective beamforming vector on the opposite side is optimized.

Using the static allocation has little complexity, since the MIMO branches are firmly allocated to one another and the beamforming subsystems have, at the most, the dimension $$\max_{1 \le p \le P} M_p \times \max_{1 \le q \le Q} N_q.$$

In accordance with embodiments, the second approach comprises asymmetric splitting of the beamforming system. The basic idea of this approach is splitting the hybrid MIMO beamforming overall system into asymmetric subsystems, each having only one MIMO branch on the transmitter side or on the receiver side. The method may be divided into two steps:

Step 1: The hybrid MIMO beamforming overall system is split into $$P \, M_p \times \sum_{q=1}^{Q} N_q$$

subsystems.

For every subsystem, a suitable transmitting beamforming vector is determined. By considering the subsystem as beamforming system, the methods described above can be used.

Step 2: The hybrid MIMO beamforming overall system is split into $$Q \sum_{p=1}^{P} N_p \times M_q.$$

subsystems.

For every subsystem, a suitable receiving beamforming vector is determined. By considering the subsystem as beamforming system, the methods described above may be used. (Method without considering the transmission beam, determining the beamforming vectors in reverse order).

After these steps, all transmitting and receiving beamforming vectors are determined. If the methods described above are used, step 1 and step 2 may be considered independently of one another and are exchangeable. Further, the subsystems may be considered in any order.

Figure 8A:
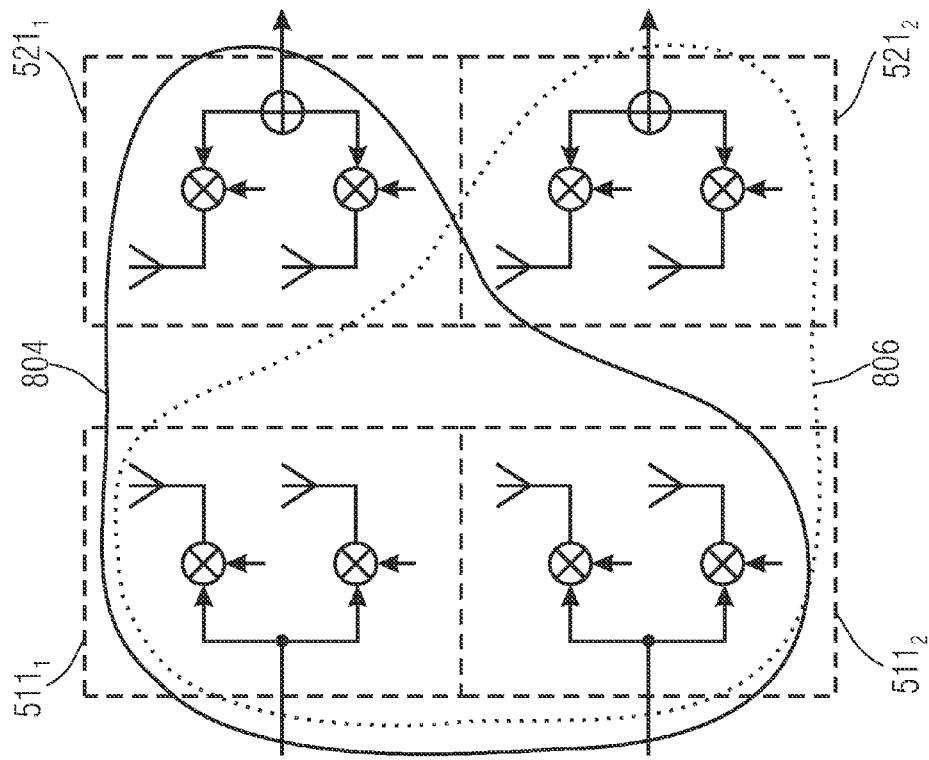
FIGS. 8(a) and 8(b) show examples for the asymmetric splitting of a 2×2 MIMO system as it is for example described in FIG. 5.
Figure 8B:
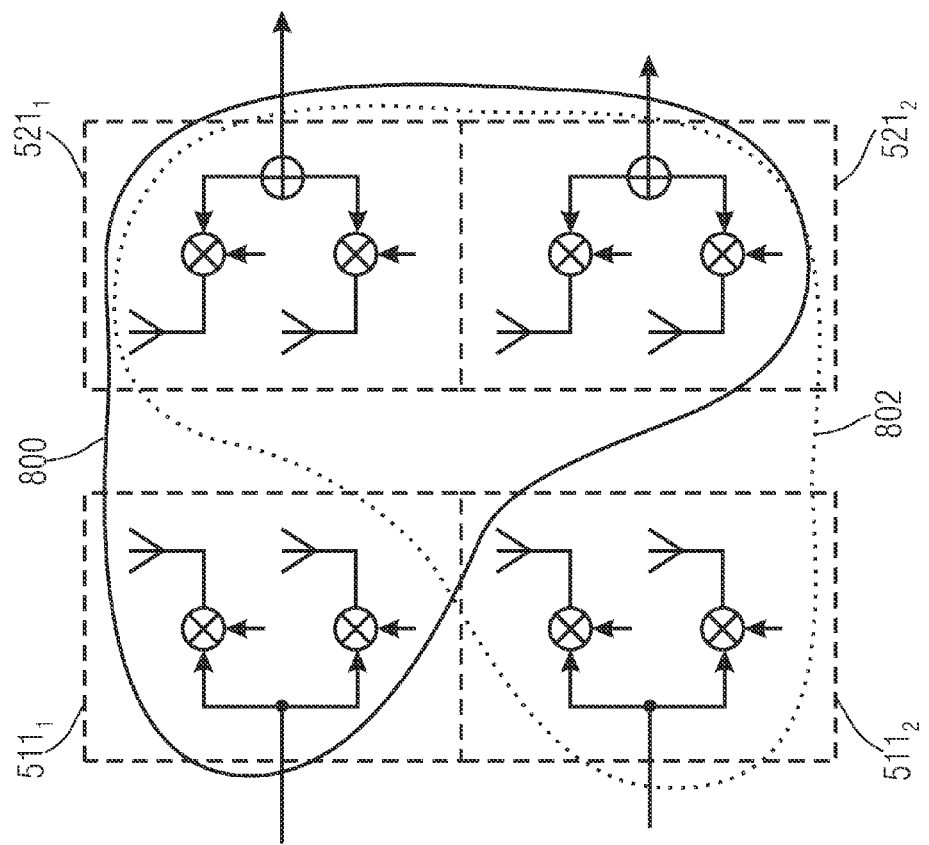

FIG. 8 shows an example of the asymmetric splitting of a hybrid 2×2 MIMO beamforming system as it is for example described in FIG. 5. In FIG. 8(a) the first subsystem 800 which is an asymmetric system, comprises the first MIMO branch $511_1$ of the transmitter 502 and the first and second MIMO branches $521_1$ and $521_2$ of the receiver 514. The second asymmetric subsystem 802 comprises the second MIMO branch $511_2$ of the transmitter 502 and the two MIMO branches $521_1$ and $521_2$ of the receiver 514. In the embodiment shown in FIG. 8(b) an asymmetric subsystem 804 comprises the MIMO branches $511_1$ and $511_2$ of the transmitter 502 and the first MIMO branch $521_1$ of the receiver 514. The asymmetric, subsystem 806 comprises the two MIMO branches $511_1$ and $511_2$ of the transmitter 502, and the second MIMO branch $521_2$ of the receiver 514.

FIG. 8 illustrates the two steps for splitting a hybrid MIMO beamforming system having two MIMO branches at the transmitter and receiver. For the specific cases that a hybrid SIMO (single-input multiple-output) or a MISO (multiple-input single-output) beamforming system is treated and the subsystems are considered as beamforming systems, the modifications described below will be considered, which increase the gain obtainable by beamforming.

For the special case of a SIMO beamforming system (P=1, Q>1) first, the $$M \times \sum_{q=1}^{Q} N_q$$

beamforming system is considered and a suitable transmitting beamforming vector is determined. Then, the SIMO beamforming overall system is split into Q M×$N_q$ subsystems. For every subsystem, a suitable receiving beamforming vector is determined. The difference to the basic method is that during determining the receiving beamforming vectors, the previously determined transmitting beamforming vector is considered.

For the special case of a MISO beamforming system (P>1, Q=1), first, the $$\sum_{p=1}^{P} M_p \times N$$

beamforming system is considered and a suitable receiving beamforming vector is determined without considering transmitting beamforming vectors. Then, the MISO beamforming overall system is divided into P $M_p \times N$ subsystems. For every beamforming subsystem, a suitable transmitting beamforming vector is determined. The difference to the basic method is that during determining the transmitting beamforming vectors, the previously determined receiving beamforming vector is considered.

In accordance with embodiments splitting a hybrid MIMO beamforming system into several subsystems is advantageous as this allows the determination of suitable beamforming vectors in hybrid MIMO beamforming systems by applying known methods for determining the suitable beamforming vectors in beamforming systems.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed. Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer. A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein. A further embodiment comprises a computer having installed thereon the computer program for performing one of the methods described herein. In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A method for determining a beamforming vector of an antenna group of a transmitting station in a wireless communication system and a beamforming vector of an antenna group of a receiving station in the wireless communication system, wherein each of the transmitting station and the receiving station comprises a codebook including a plurality of predefined beamforming vectors, the method comprising:

performing a test transmission from the transmitting station to the receiving station using a test signal and a beamforming vector pair, the beamforming vector pair comprising a beamforming vector selected from the codebook of the transmitting station and a beamforming vector selected from the codebook of the receiving station, determining a transmission characteristic of the test transmission at the receiving station, repeating the test transmission and the determination of the transmission characteristic using different beamforming vector pairs, and determining the beamforming vectors of the transmitting and receiving stations from the beamforming vector pair for which the transmission characteristic comprises a predefined value, wherein the beamforming vectors for the transmitting station and for the receiving station are each taken column by column, starting with column 1, successively from respective training matrices $T_T$ at the transmitting station and $T_R$ at the receiving station so that each beamforming vector from the codebook of the transmitting station encounters all beamforming vectors from the codebook of the receiving station, and wherein the training matrices $T_T$, $T_R$ are determined as follows:

$$T_T = 1_{1,K_R} \otimes C_T,$$

$$T_R = C_R \otimes 1_{1,K_T},$$

wherein:

$T_T$=training matrix for beamforming at the transmitting station, $T_R$=training matrix for beamforming at the receiving station, $C_T$=codebook matrix of the transmitting station, $C_R$=codebook matrix of the receiving station, $K_T$=the number of beamforming vectors in the codebook of the transmitting station, $K_R$=the number of beamforming vectors in the codebook of the receiving station, $1_{1,KT}$=a row vector comprising $K_T$ elements that are each 1, $1_{1,KR}$=a row vector comprising $K_R$ elements that are each 1.

2. The method of claim 1, wherein determining the transmission characteristic is done at the receiving station, and wherein the transmitting station is informed about the beamforming vector determined from the beamforming vector pair.

3. The method of claim 2, wherein informing the transmitting station comprises sending the determined beamforming vector or an information identifying the determined beamforming vector to the transmitting station.

4. The method of claim 1, wherein the wireless communication system comprises a plurality of stations allowing for a bidirectional transmission there between, wherein the method is performed for both directions for achieving for the station a transmit beamforming vector when the station operates as a transmitting station, and for achieving a receive beamforming vector when the station operates as a receiving station.

5. The method of claim 1, wherein the wireless communication system comprises a plurality of stations allowing for a bidirectional transmission there between, wherein a station uses the same antennas for transmitting and receiving, and wherein a beamforming vector determined for the station is used both for transmitting and receiving.

6. The method of claim 1, wherein the transmission characteristic comprises a receive power, a signal-to-noise ratio, a signal-to-interference ratio, and a signal to interference-plus-noise ratio, and wherein the predefined value comprises a maximum of the receive power, of the signal-to-noise ratio, of the signal-to-interference ratio, and of the signal to interference-plus-noise ratio.

7. A wireless communication system comprising:
a transmitting station comprising an antenna group and a codebook comprising a plurality of predefined beamforming vectors for the antenna group of the transmitting station, and
a receiving station comprising an antenna group and a codebook comprising a plurality of predefined beamforming vectors for the antenna group of the receiving station,
wherein, for determining a beamforming vector of the antenna groups of the transmitting and receiving stations, the wireless communication system is configured to:
perform a test transmission from the transmitting station to the receiving station using a test signal and a beamforming vector pair, the beamforming vector pair comprising a beamforming vector selected from the codebook of the transmitting station and a beamforming vector selected from the codebook of the receiving station,
determine a transmission characteristic of the test transmission at the receiving station,
repeat the test transmission and the determination of the transmission characteristic using different beamforming vector pairs, and
determine the beamforming vectors of the transmitting and receiving stations from the beamforming vector pair for which the transmission characteristic comprises a predefined value,
wherein the beamforming vectors for the transmitting station and for the receiving station are each taken column by column, starting with column 1, successively from respective training matrices $T_T$ at the transmitting station and $\underline{T}_R$ at the receiving station so that that each beamforming vector from the codebook of the transmitting station encounters all beamforming vectors from the codebook of the receiving station, and wherein the training matrices $T_T$, $T_R$ are determined as follows:

$$T_T = 1_{1,K_R} \otimes C_T,$$

$$T_R = C_R \otimes 1_{1,K_T},$$

wherein:

$T_T$=training matrix for beamforming at the transmitting station, $T_R$=training matrix for beamforming at the receiving station, $C_T$=codebook matrix of the transmitting station, $C_R$=codebook matrix of the receiving station, $K_T$=the number of beamforming vectors in the codebook of the transmitting station, $K_R$=the number of beamforming vectors in the codebook of the receiving station, $1_{1,KT}$=a row vector comprising $K_T$ elements that are each 1, $1_{1,KR}$=a row vector comprising $K_R$ elements that are each 1.

8. A method for determining a beamforming channel matrix describing a radio channel between a transmitting station and a receiving station of a wireless communication system, the transmitting and receiving stations comprising respective antenna groups, the method comprising:

performing a plurality of test transmissions from the transmitting station to the receiving station using a test signal, wherein for each of the plurality of test transmissions the beamforming vectors at the transmitting station and at the receiving station are varied on the basis of a transmit estimate matrix $E_T$ and a receive estimate matrix $E_R$, wherein each element of an estimate matrix defines the beamforming weight for a specific antenna from the antenna group used during a specific test transmission, and determining from all test transmissions the beamforming channel matrix, wherein the transmit and receive estimate matrices $E_T$, $E_R$ are defined as follows:

$$E_T = 1_{1,N} \otimes B_T,$$

$$E_R = B_R \otimes 1_{1,M},$$

wherein:

$E_T$=transmit estimate matrix, $B_T$=base transmit estimate matrix comprising the dimension M×M for the transmitting station comprising M transmit antennas and comprising beamforming weights for the transmitting station, $E_R$=receive estimate matrix, $B_R$=base receive estimate matrix comprising the dimension N×N for the receiving station comprising N receive antennas and comprising beamforming weights for the receiving station, $1_{1,N}$=a row vector comprising N elements that are equal 1, and $1_{1,M}$=a row vector comprising M elements that are equal 1, wherein $[E_T]_{m,k}$ describes a beamforming weight for the m-th transmit antenna during the k-th test transmission of N·M test transmissions, wherein $[E_R]_{n,k}$ describes a beamforming weight for the n-th receive antenna during the k-th transmission of the N·M test transmissions, and wherein the beamforming channel matrix is estimated based on the base transmit estimate matrix $B_T$, the base receive estimate matrix $B_R$ and the received test signal.

9. The method of claim 8, wherein the base transmit estimate matrix $E_T$ and the base receive estimate matrix $E_R$ comprises the beamforming vectors in chronological order starting with column 1.

10. The method of claim 8, wherein the base transmit estimate matrix $E_T$ and the base receive estimate matrix $E_R$ are square matrices.

11. The method of claim 10, wherein the wireless communication system uses equal-gain beamforming, and wherein the base transmit estimate matrix $E_T$ and the base receive estimate matrix $E_R$ are unitary matrices.

12. The method of claim 11, wherein the unitary base transmit and receive estimate matrices comprise a N×N Hadamard matrix multiplied by $1/\sqrt{N}$, a matrix comprising four equidistant phase states, a matrix comprising $\sqrt{N}$ or $\sqrt{M}$ equidistant phase states, or a matrix comprising N or M equidistant phase states, wherein N is the number of receiving antennas, and M is the number of transmitting antennas.

13. The method of claim 8, wherein the beamforming channel matrix is estimated as follows:

$$h = S^{-1}d,$$

wherein:
h=vec(H)=vectorized beamforming channel matrix, $$S = (B_R \otimes B_T)^T$$

$B_R$=base receive estimate matrix,
$B_T$=base transmit estimate matrix, and
d=transfer coefficient vector for each test signal,
wherein
$d = X^{-1}y$,
$X = \text{diag}(x)$,
X=vector of transmitted training symbols, and
y=vector of received training symbols.

14. The method of claim 13, wherein the base transmit and receive estimate matrices are unitary matrices, and wherein the beamforming channel matrix is estimated as follows:

$$h = S^H d.$$

15. The method of claim 8, wherein the wireless communication system comprises a plurality of stations allowing for a bidirectional transmission there between, wherein the method is performed for both directions for achieving for the station a transmit beamforming channel matrix when the station operates as a transmitting station, and for achieving a receive beamforming channel matrix when the station operates as the receiving station.

16. The method of claim 8, wherein the wireless communication system comprises a plurality of stations allowing for a bidirectional transmission there between, wherein a station uses the same antennas for transmitting and receiving, and wherein the beamforming channel matrix determined for the station is used both for transmitting and receiving.

17. A wireless communication network comprising:
a transmitting station comprising an antenna group for beamforming, and
a receiving station comprising an antenna group for beamforming,
wherein, for determining a beamforming channel matrix describing a radio channel between a transmitting station and a receiving station of the wireless communication system, the wireless communication system is configured to:
perform a plurality of test transmissions from the transmitting station to the receiving station using a test signal, wherein for each of the plurality of test transmissions the beamforming vectors at the transmitting station and at the receiving station are varied on the basis of a transmit estimate matrix and a receive estimate matrix, wherein each element of an estimate matrix defines the beamforming weight for a specific antenna from the antenna group used during a specific test transmission, and
determine from all test transmissions the beamforming channel matrix,
wherein the transmit and receive estimate matrices $E_T$, $E_R$ are defined as follows:

$$E_T = 1_{1,N} \otimes B_T,$$

$$E_R = B_R \otimes 1_{1,M},$$

wherein:
$E_T$=transmit estimate matrix,
$B_T$=base transmit estimate matrix comprising the dimension M×M for the transmitting station comprising M transmit antennas and comprising beamforming weights for the transmitting station,
$E_R$=receive estimate matrix,
$B_R$=base receive estimate matrix comprising the dimension N×N for the receiving station comprising N receive antennas and comprising beamforming weights for the receiving station,
$1_{1,N}$=a row vector comprising N elements that are equal 1, and
$1_{1,M}$=a row vector comprising M elements that are equal 1,
wherein $[E_T]_{m,k}$ describes a beamforming weight for the m-th transmit antenna during the k-th test transmission of N·M test transmissions,
wherein $[E_R]_{n,k}$ describes a beamforming weight for the n-th receive antenna during the k-th transmission of the N·M test transmissions, and
wherein the beamforming channel matrix is estimated based on the base transmit estimate matrix $B_T$, the base receive estimate matrix $B_R$ and the received test signal.

18. A method for determining a transmit beamforming vector $w_{CH}$ of an antenna group of a transmitting station in a wireless communication system and a receive beamforming vector $z_{CH}$ of an antenna group of a receiving station in the wireless communication system, wherein each of the transmitting station and the receiving station comprises a codebook $C_T$, $C_R$ comprising a plurality of predefined beamforming vectors w, z, the method comprising:
determining from the codebook $C_T$ of the transmitting station the transmit beamforming vector $w_{CH}$ yielding a first predefined result when applying the beamforming weights defined in the beamforming vectors w from the codebook $C_T$ of the transmitting station to a known beamforming channel matrix H describing the radio channel between the transmitting station and the receiving station, and
determining from the codebook $C_R$ of the receiving station the receive beamforming vector $z_{CH}$ yielding a second predefined result when applying the beamforming weights defined in the beamforming vectors z from the codebook $C_R$ of the receiving station to a combination of the known beamforming channel matrix H and the determined transmit beamforming vector $W_{CH}$.

19. The method of claim 18, wherein for determining the beamforming vectors an optimization method or a search across all beamforming vectors of the respective codebook is made.

20. The method of claim 18, wherein determining the beamforming vector for the transmitting station comprises selecting the beamforming vector $w_{CH}$ from the codebook $C_T$ of the transmitting station in accordance with the following equation:

$$w_{CH} = \arg\max_{w \in C_T} \|Hw\|_1$$

wherein:
H=known beamforming channel matrix,
w=beamforming vector from the codebook $C_T$, and
$\|\ \|_1$=$L_1$ Norm, Taxi Cab Norm or Manhattan Norm.

21. The method of claim 20, wherein determining the beamforming vector for the receiving station comprises selecting the beamforming vector $z_{CH}$ from the codebook $C_R$ of the receiving station in accordance with the following equation:

$$z_{CH} = \arg\max_{z \in C_R} |z^T H w_{CH}|$$
$$= \arg\max_{z \in C_R} |z^T h_{w,CH}|$$

wherein:
z=beamforming vector from the codebook $C_R$.

22. The method of claim 20, wherein determining the beamforming vector for the receiving station comprises determining $z_H$ as follows and selecting from the codebook the beamforming vector $z_{CH}$ comprising the maximum correlation with $z_H$:

$$z_H = \frac{1}{\sqrt{N}} \exp(-jL(Hw_{CH}))$$
$$z_{CH} = \arg\max_{z \in C_R} |z_H^H z|$$

23. A method for determining a transmit beamforming vector $w_{CH}$ of an antenna group of a transmitting station in a wireless communication system and a receive beamforming vector $z_{CH}$ of an antenna group of a receiving station in the wireless communication system, wherein each of the transmitting station and the receiving station comprises a codebook $C_T$, $C_R$ comprising a plurality of predefined beamforming vectors w, z, the method comprising:
determining from the codebook $C_R$ of the receiving station the receive beamforming vector $z_{CH}$ yielding a first predefined result when applying the beamforming weights defined in the beamforming vectors z from the codebook $C_R$ of the receiving station to a known beamforming channel matrix H describing the radio channel between the transmitting station and the receiving station, and
determining from the codebook $C_T$ of the transmitting station the transmit beamforming vector $w_{CH}$ yielding a second predefined result when applying the beamforming weights defined in the beamforming vectors w from the codebook $C_T$ of the transmitting station to a combination of the known beamforming channel matrix H and the determined receive beamforming vector $z_{CH}$.

24. The method of claim 23, wherein determining the beamforming vector for the receiving station comprises selecting the beamforming vector $z_{CH}$ from the codebook $C_R$ of the receiving station in accordance with the following equation:

$$z_{CH} = \arg\max_{z \in C_R} \|H^T z\|_1$$

wherein:
$H^T$=known transposed beamforming channel matrix,
z=beamforming vector from the codebook $C_R$, and
$\|\ \|_1$=$L_1$ Norm, Taxi Cab Norm or Manhattan Norm.

25. The method of claim 24, wherein determining the beamforming vector for the transmitting station comprises selecting the beamforming vector $w_{CH}$ from the codebook $C_T$ of the transmitting station in accordance with the following equation:

$$w_{CH} = \arg\max_{w \in C_T} |w^T H^T z_{CH}|$$

wherein:
w=beamforming vector from the codebook $C_T$.

26. The method of claim 24, wherein determining the beamforming vector for the transmitting station comprises determining $w_H$ as follows and selecting from the codebook the beamforming vector $w_{CH}$ comprising the maximum correlation with $w_H$:

$$w_H = \frac{1}{\sqrt{N}} \exp(-jL(H^T z_{CH}))$$
$$w_{CH} = \arg\max_{w \in C_T} \|w_H^H w\|_1$$

27. The method of claim 18, wherein the wireless communication system comprises a multi-carrier system comprising K subcarriers, and wherein from the plurality of beamforming channel matrices $H^{(k)}$ for the respective subcarriers the beamforming channel matrix $H^{(I)}$ which comprises the largest sum of the absolute values of the matrix values is selected for determining the beamforming vectors, wherein I is determined as follows:

$$l = \arg\max_{1 \le k \le K} \sum_{n=1}^{N} \sum_{m=1}^{M} |h_{n,m}^{(k)}|.$$

28. The method of claim 18, wherein the wireless communication system comprises a multi-carrier system comprising K subcarriers, and wherein from the plurality of beamforming channel matrices $H^{(k)}$ for the respective subcarriers the beamforming channel matrix $H^{(I)}$ which comprises the largest sum of the absolute values of the matrix values is selected for determining the beamforming vectors, wherein I is determined as follows:

$$l = \arg\max_{k \in K} \sum_{n=1}^{N} \sum_{m=1}^{M} |h_{n,m}^{(k)}|$$

$$K \subset \{1, 2, \ldots K\}.$$

wherein $h_{n,m}^{(k)}$ is the matrix element of the matrix $H^{(k)}$ in the $n^{th}$ row and the $m^{th}$ column.

29. The method of claim 18, wherein the wireless communication system comprises a plurality of stations allowing for a bidirectional transmission there between, wherein the method is performed for both directions for achieving for the station a transmit beamforming vector when the station operates as a transmitting station, and for achieving a receive beamforming vector when the station operates as a receiving station.

30. The method of claim 18, wherein the wireless communication system comprises a plurality of stations allowing for a bidirectional transmission there between, wherein a station uses the same antennas for transmitting and receiving, and wherein a beamforming vector determined for the station is used both for transmitting and receiving.

31. A wireless communication system comprising:
a transmitting station comprising an antenna group and a codebook $C_T$ comprising a plurality of predefined beamforming vectors w for the antenna group of the transmitting station, and
a receiving station comprising an antenna group and a codebook $C_R$ comprising a plurality of predefined beamforming vectors z for the antenna group of the receiving station,
wherein, for determining a transmit beamforming vector $w_{CH}$ of the antenna groups of the transmitting station and for determining a receive beamforming vector $z_{CH}$ of the antenna groups of the receiving station, the wireless communication system is configured to:
determine from the codebook $C_T$ of the transmitting station the transmit beamforming vector $w_{CH}$ yielding a first predefined result when applying the beamforming weights defined in the beamforming vectors w from the codebook $C_T$ of the transmitting station to a known beamforming channel matrix H describing the radio channel between the transmitting station and the receiving station, and determine from the codebook $C_R$ of the receiving station the receive beamforming vector $z_{CH}$ yielding a second predefined result when applying the beamforming weights defined in the beamforming vectors z from the codebook $C_R$ of the receiving station to a combination of the known beamforming channel matrix H and the determined transmit beamforming vector $w_{CH}$, or
determine from the codebook $C_R$ of the receiving station the receive beamforming vector $z_{CH}$ yielding a first predefined result when applying the beamforming weights defined in the beamforming vectors z from the codebook $C_R$ of the receiving station to a known beamforming channel matrix H describing the radio channel between the transmitting station and the receiving station, and determine from the codebook $C_T$ of the transmitting station the transmit beamforming vector $w_{CH}$ yielding a second predefined result when applying the beamforming weights defined in the beamforming vectors w from the codebook $C_T$ of the transmitting station to a combination of the known beamforming channel matrix H and the determined receive beamforming vector $z_{CH}$.

32. A method for determining beamforming vectors for a transmitting station in a wireless communication system that comprises a hybrid MIMO beamforming system and beamforming vectors for a receiving station in the wireless communication system, wherein the transmitting station comprises a hybrid MIMO beamforming configuration including a plurality of MIMO transmit branches, each of the plurality of MIMO transmit branches including a plurality of transmit antennas, and wherein the receiving station comprises a hybrid MIMO beamforming configuration including a plurality of MIMO receive branches, each of the plurality MIMO receive branches including a plurality of receive antennas, the method comprising:
splitting the hybrid MIMO beamforming system into a plurality of subsystems, each subsystem comprising at least one MIMO transmit branch on the transmitting side and at least one MIMO receive branch on the receiving side, and
determining the transmit and the receive beamforming parameters for each subsystem separately.

33. The method of claim 32, wherein splitting the hybrid MIMO beamforming system comprises assigning each MIMO transmit branch to a MIMO receive branch and each MIMO receive branch to a MIMO transmit branch.

34. The method of claim 33, wherein the branches are assigned such that the number of MIMO receive branches assigned to the same MIMO transmit branch or the number of MIMO transmit branches assigned to the same MIMO receive branch is minimized.

35. The method of claim 33, wherein assigning comprises:
assigning the branches such that, in case a plurality of MIMO receive branches is allocated to the same MIMO transmit branch, the MIMO receive branches whose MIMO antennas are spatially as far as possible apart from one another are assigned to the same MIMO transmit branch, or
assigning the branches such that, in case a plurality of MIMO transmit branches is allocated to the same MIMO receive branch, the MIMO transmit branches whose MIMO antennas are spatially as far as possible apart from one another are assigned to the same MIMO receive branch.

36. The method of claim 35, wherein dependent on the MIMO signal processing not the MIMO branches comprising the most distant antennas but those MIMO branches comprising their antennas as close as possible are used.

37. The method of claim 32, wherein the hybrid MIMO beamforming system is split into asymmetric subsystems comprising only one MIMO branch on the transmitting side or on the receiving side.

38. The method of claim 37, wherein splitting the hybrid MIMO beamforming system comprises:
dividing the hybrid MIMO beamforming system into $$P M_p \times \sum_{q=1}^{Q} N_q$$

beamforming subsystems, wherein:
P=number of MIMO transmit branches,
$M_p$=the number of transmit beamforming branches of the p-th MIMO transmit branch,
Q=number of MIMO receive branches, $N_q$=number of the receive beaming branches of the q-th MIMO receive branch,
dividing the MIMO beamforming system into $$Q \sum_{p=1}^{P} N_p \times M_q$$

beamforming subsystems, wherein:
Q=number of MIMO receive branches,
P=number of MIMO transmit branches,
$N_p$=number of receive beamforming branches of the p-th MIMO receive branch, and
$M_q$=number of transmit beamforming branches of the q-th MIMO transmit branch, and
wherein the transmit and receive beamforming vectors are determined for the P beamforming subsystems and the Q beamforming subsystems separately.

39. The method of claim 32, wherein determining the beamforming parameters for each subsystem comprises one or more of the following:
(1) determining the beamforming vector of the transmitting station and of the receiving station in the wireless communication system, wherein each of the transmitting station and the receiving station comprises a codebook comprising a plurality of predefined beamforming vectors, by
performing a test transmission from the transmitting station to the receiving station using a test signal and a beamforming vector pair, the beamforming vector pair comprising a beamforming vector selected from the codebook of the transmitting station and a beamforming vector selected from the codebook of the receiving station,
determining a transmission characteristic of the test transmission at the receiving station,
repeating the test transmission and the determination of the transmission characteristic using different beamforming vector pairs, wherein the beamforming vectors in the beamforming vector pair are selected such that each beamforming vector from the codebook of the transmitting station encounters all beamforming vectors from the codebook of the receiving station, and
determining the beamforming vectors of the transmitting and receiving stations from the beamforming vector pair for which the transmission characteristic comprises a predefined value, or
(2) determining the beamforming channel matrix describing a radio channel between the transmitting station and the receiving station, the transmitting and receiving stations comprising respective antenna groups and respective codebooks comprising a plurality of predefined beamforming vectors for the antenna group, by
performing a plurality of test transmissions from the transmitting station to the receiving station using a test signal, wherein for each of the plurality of test transmissions the beamforming vectors at the transmitting station and at the receiving station are varied on the basis of a transmit estimate matrix and a receive estimate matrix, wherein each element of an estimate matrix defines the beamforming weight for a specific antenna from the antenna group used during a specific test transmission, and
determining from all test transmissions the beamforming channel matrix, or
(3) determining a beamforming vector of the transmitting station and the receiving station, wherein each of the transmitting station and the receiving station comprises a codebook comprising a plurality of predefined beamforming vectors, by
determining from the codebook of the transmitting or receiving station the beamforming vector yielding a first predefined result when applying the beamforming weights defined in the beamforming vector to a known beamforming channel matrix describing the radio channel between the transmitting station and the receiving station, and
determining from the codebook of the receiving or transmitting station the beamforming vector yielding a second predefined result when applying the beamforming weights defined in the beamforming vector to a combination of the known beamforming channel matrix and the determined transmit or receive beamforming vector.

40. A wireless communication system including a hybrid MIMO beamforming system, the wireless communication system comprising:
a transmitting station having a hybrid MIMO beamforming configuration including a plurality of MIMO transmit branches, each of the plurality of MIMO transmit branches including a plurality of transmit antennas, and
a receiving station having a hybrid MIMO beamforming configuration including a plurality of MIMO receive branches, each of the plurality of MIMO receive branches including a plurality of receive antennas,
wherein the system is configured to
split the hybrid MIMO beamforming system into a plurality of subsystems, each subsystem comprising at least one MIMO transmit branch on the transmitting side and at least one MIMO receive branch on the receiving side, and
determine the beamforming vectors for each subsystem separately.

41. A non-transitory computer readable medium including a computer program comprising instructions for performing a method for determining a beamforming vector of an antenna group of a transmitting station in a wireless communication system and a beamforming vector of an antenna group of a receiving station in the wireless communication system, wherein each of the transmitting station and the receiving station comprises a codebook comprising a plurality of predefined beamforming vectors, when executing the instructions by a computer, the method comprising:
performing a test transmission from the transmitting station to the receiving station using a test signal and a beamforming vector pair, the beamforming vector pair comprising a beamforming vector selected from the codebook of the transmitting station and a beamforming vector selected from the codebook of the receiving station,
determining a transmission characteristic of the test transmission at the receiving station,
repeating the test transmission and the determination of the transmission characteristic using different beamforming vector pairs, and
determining the beamforming vectors of the transmitting and receiving stations from the beamforming vector pair for which the transmission characteristic comprises a predefined value, wherein the beamforming vectors for the transmitting station and for the receiving station are each taken column by column, starting with column 1, successively from respective training matrices $T_T$ at the transmitting station and $\underline{T}_R$ at the receiving station so that that each beamforming vector from the codebook of the transmitting station encounters all beamforming vectors from the codebook of the receiving station, and wherein the training matrices $T_T$, $T_R$ are determined as follows:

$$T_T = 1_{1,K_R} \otimes C_T,$$

$$T_R = C_R \otimes 1_{1,K_T},$$

wherein:
$T_T$=training matrix for beamforming at the transmitting station,
$T_R$=training matrix for beamforming at the receiving station,
$C_T$=codebook matrix of the transmitting station,
$C_R$=codebook matrix of the receiving station,
$K_T$=the number of beamforming vectors in the codebook of the transmitting station,
$K_R$=the number of beamforming vectors in the codebook of the receiving station,
$1_{1,KT}$=a row vector comprising $K_T$ elements that are each 1,
$1_{1,KR}$=a row vector comprising $K_R$ elements that are each 1.

42. A non-transitory computer readable medium including a computer program comprising instructions for performing a method for determining a beamforming channel matrix describing a radio channel between a transmitting station and a receiving station of a wireless communication system, the transmitting and receiving stations comprising respective antenna groups and respective codebooks comprising a plurality of predefined beamforming vectors for the antenna group, when executing the instructions by a computer, the method comprising:

performing a plurality of test transmissions from the transmitting station to the receiving station using a test signal, wherein for each of the plurality of test transmissions the beamforming vectors at the transmitting station and at the receiving station are varied on the basis of a transmit estimate matrix $E_T$, and a receive estimate matrix $E_R$, wherein each element of an estimate matrix defines the beamforming weight for a specific antenna from the antenna group used during a specific test transmission, and determining from all test transmissions the beamforming channel matrix, wherein the transmit and receive estimate matrices $E_T$, $E_R$ are defined as follows:

$$E_R = B_R \otimes 1_{1,M},$$

$$E_T = 1_{1,N} \otimes B_T,$$

wherein:
$E_T$=transmit estimate matrix,
$B_T$=base transmit estimate matrix comprising the dimension M×M for the transmitting station comprising M transmit antennas and comprising beamforming weights for the transmitting station,
$E_R$=receive estimate matrix,
$B_R$=base receive estimate matrix comprising the dimension N×N for the receiving station comprising N receive antennas and comprising beamforming weights for the receiving station,
$1_{1,N}$=a row vector comprising N elements that are equal 1, and
$1_{1,M}$=a row vector comprising M elements that are equal 1,
wherein $[E_T]_{m,k}$ describes a beamforming weight for the m-th transmit antenna during the k-th test transmission of N·M test transmissions,
wherein $[E_R]_{n,k}$ describes a beamforming weight for the n-th receive antenna during the k-th transmission of the N·M test transmissions, and
wherein the beamforming channel matrix is estimated based on the base transmit estimate matrix $B_T$, the base receive estimate matrix $B_R$ and the received test signal.

43. A non-transitory computer readable medium including a computer program comprising instructions for performing a method for determining a beamforming vector $w_{CH}$ of an antenna group of a transmitting station in a wireless communication system and a beamforming vector $z_{CH}$ of an antenna group of a receiving station in the wireless communication system, wherein each of the transmitting station and the receiving station comprises a codebook $C_T$, $C_R$ comprising a plurality of predefined beamforming vectors w, z, when executing the instructions by a computer, the method comprising:

determining from the codebook $C_T$ of the transmitting station the transmit beamforming vector $w_{CH}$ yielding a first predefined result when applying the beamforming weights defined in the beamforming vectors w from the codebook $C_T$ of the transmitting station to a known beamforming channel matrix H describing the radio channel between the transmitting station and the receiving station, and determining from the codebook $C_R$ of the receiving station the receive beamforming vector $z_{CH}$ yielding a second predefined result when applying the beamforming weights defined in the beamforming vectors z from the codebook $C_R$ of the receiving station to a combination of the known beamforming channel matrix H and the determined transmit beamforming vector $w_{CH}$, or determining from the codebook $C_R$ of the receiving station the receive beamforming vector $z_{CH}$ yielding a first predefined result when applying the beamforming weights defined in the beamforming vectors z from the codebook $C_R$ of the receiving station to a known beamforming channel matrix H describing the radio channel between the transmitting station and the receiving station, and determining from the codebook $C_T$ of the transmitting station the transmit beamforming vector $w_{CH}$ yielding a second predefined result when applying the beamforming weights defined in the beamforming vectors w from the codebook $C_T$ of the transmitting station to a combination of the known beamforming channel matrix H and the determined receive beamforming vector $z_{CH}$.

44. A non-transitory computer readable medium including a computer program comprising instructions for performing a method for determining a beamforming vector for a transmitting station in a wireless communication system that comprises a hybrid MIMO beamforming system and a beamforming vector for a receiving station in the wireless communication system, wherein the transmitting station comprises a hybrid MIMO beamforming configuration including a plurality of MIMO transmit branches, each of the plurality of MIMO transmit branches including a plurality of transmit antennas, and wherein the receiving station comprises a hybrid MIMO beamforming configuration including a plurality of MIMO receive branches, each of the plurality of MIMO receive branches including a plurality of receive antennas, when executing the instructions by a computer, the method comprising:

splitting the hybrid MIMO beamforming system into a plurality of subsystems, each subsystem comprising at least one MIMO transmit branch on the transmitting side and at least one MIMO receive branch on the receiving side, and determining the beamforming parameters for each subsystem separately.

* * * * *